United States Patent [19]

Devaney

[11] Patent Number: 4,562,540
[45] Date of Patent: Dec. 31, 1985

[54] DIFFRACTION TOMOGRAPHY SYSTEM AND METHODS

[75] Inventor: Anthony J. Devaney, Ridgefield, Conn.

[73] Assignee: Schlumberger Technology Corporation, New York, N.Y.

[21] Appl. No.: 441,323

[22] Filed: Nov. 12, 1982

[51] Int. Cl.$^4$ .................. G01V 5/00; G01N 29/00; G06F 15/42

[52] U.S. Cl. .................. 364/400; 73/602; 128/660; 250/256; 364/414; 364/421; 364/422; 378/901

[58] Field of Search .................. 250/256, 253, 269; 378/901, 4; 73/602; 364/420, 414, 422, 400, 421; 128/660; 367/14

[56] References Cited

U.S. PATENT DOCUMENTS

| | | | |
|---|---|---|---|
| 3,983,399 | 9/1976 | Cox, Jr. et al. | 364/414 X |
| 4,042,811 | 8/1977 | Brunnett et al. | 364/414 X |
| 4,214,226 | 7/1980 | Narasimhan et al. | 181/102 |
| 4,331,877 | 5/1982 | Barrett et al. | 364/414 X |
| 4,409,838 | 10/1983 | Schomberg | 73/602 |

OTHER PUBLICATIONS

Pan, S. X. et al., "A Computational Study of Reconstructive Algorithms for Diffraction Tomography: Interpolation Versus Filtered Backpropagation", *IEEE Trans. Acoust., Speech, Signal Processing*, vol. ASSP-31, No. 5, Oct. 1983, 1262-1275.
Norton, S. J. et al., "Ultrasonic Reflectivity Imaging in Three Dimensions: Exact Inverse Scattering Solutions for Plane, Cylindrical, and Spherical Apertures," *IEEE Transactions on Biomedical Engineering*, vol. BME-28, No. 2, Feb. 1981, 202-220.
Fercher, A. F. et al., "Image Formation by Inversion of Scattered Data Field: Experiments and Computational Simulation," *Applied Optics*, vol. 18, No. 14, Jul. 15, 1979, 2427-31.
Mueller, R. K. et al., "Reconstructive Tomography and Applications to Ultrasonics," *Proceedings of the IEEE*, vol. 67, No. 4, Apr. 1979, 567-587.
Devaney, A. J., "A Filtered Backpropagation Algorithm for Diffraction Tomography", *Ultrasonic Imaging* 4, 1982.
Adams, M. F. et al., "Synthetic Aperture Tomographic (SAT) Imaging for Microwave Diagnostics", *IEE Proceedings*, vol. 129, Part H, No. 2, Apr. 1982.
Devaney, A. J., "Inverse-Scattering Theory Within the Rytov Approximation", *Optics Letters*, vol. 6, No. 8, Aug. 1981, 374-6.
Devaney, A. J., "A New Approach to Emission and Transmission CT," 1980 *Ultrasonics Symposium Proceedings*, vol. 2, Nov. 1980, 979-83.
Kaveh, M. et al., "A Comparison of Born and Rytov Approximations in Acoustic Tomography," *Acoustical Imaging*, vol. 2, Ed. by John P. Powers, Plenum Press, NY, 1982, 325-35.

*Primary Examiner*—Jerry Smith
*Assistant Examiner*—Clark A. Jablon
*Attorney, Agent, or Firm*—David P. Gordon; Stephen L. Borst

[57] ABSTRACT

Diffraction tomography systems and methods are disclosed for the reconstruction of physical properties of two and three-dimensional objects from information collected in one or more diffraction tomographic procedures. A diffraction tomographic system is comprised of a continuous or pulsed source of wave energy, a detecting system for the measurement of the amplitude and/or phase of the scattered field resulting from the wave energy interacting with a two or three-dimensional object, a processing and filtering system for processing and filtering the measured signals according to a filtered backpropagation technique thereby generating arrays which are used to reconstruct the object properties, and a graphics display system for displaying obtained reconstructions. Specific embodiments include ultrasound transmission computed tomography; well-to-well electromagnetic and sonic tomography; subsurface electromagnetic or seismic exploration; and X-ray transmission tomography. The methods and systems apply filtered backpropagation techniques which are generalizations of the filtered backprojection technique of X-ray computed tomography to cases where diffraction of the insonifying beam is taken into consideration.

91 Claims, 21 Drawing Figures q=17 q=13 q=9 q=5 q=1

$X_{q,m}$ Array

Rotated $X_{q,m}$ Array

Rotation $-\theta_0$

Interpolation

Interpolated onto Master Array

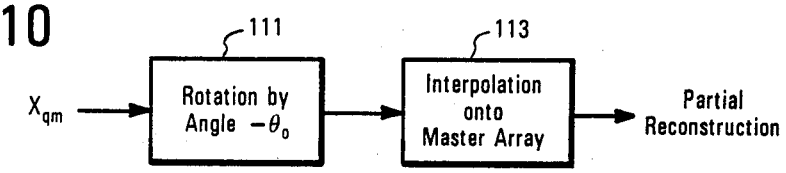
Fig. 10
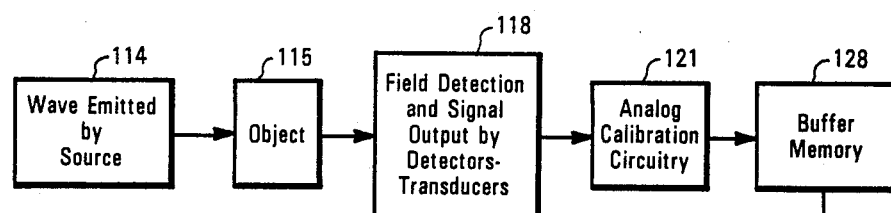
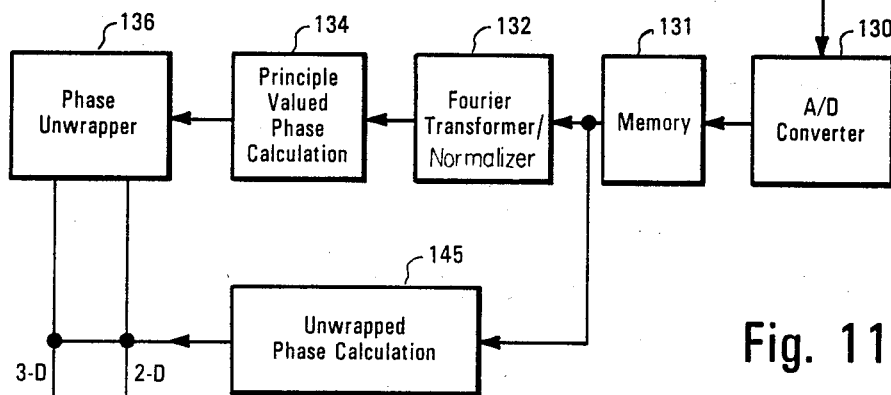
Fig. 11
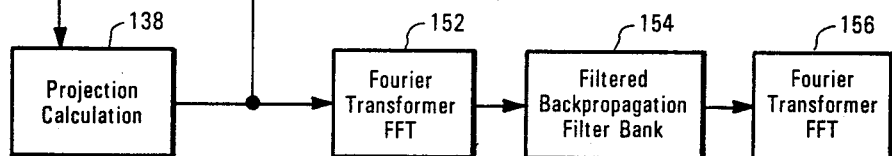
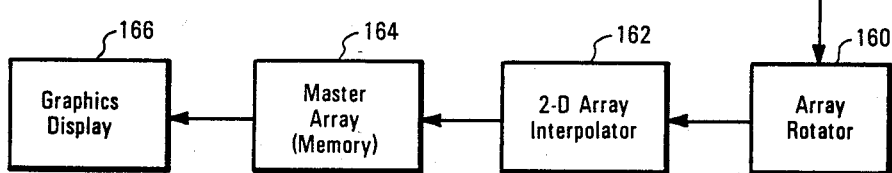

DIFFRACTION TOMOGRAPHY SYSTEM AND METHODS

BACKGROUND OF THE INVENTION

This invention relates to systems and methods for reconstructing acoustic and/or electromagnetic properties of two or three-dimensional objects using diffraction tomographic procedures. The systems and methods are useful in the medical diagnostics arts such as ultrasonic and X-ray tomography, as well as in the geophysical prospecting arts, such as well-to-well tomography and subsurface seismic prospecting.

In conventional parallel beam transmission computed tomography, an object profile $O(x,y)$ representing, for example, an X-ray attenuation coefficient, is reconstructed from the object's projections $$P_\theta(\xi) = \int O(x,y) d\eta, \tag{1}$$

where $(\xi,\eta)$ denote the coordinates in a cartesian coordinate system rotated by the angle $\theta$ relative to the $(x,y)$ system as shown in FIG. 1a. The reconstruction of $O(x,y)$ from $P_\theta(\xi)$ (which is called the "reconstruction of the object" or the "reconstruction of the object profile" by those skilled in the art) is made possible by the projection-slice theorem which states that the one-dimensional Fourier transform of $P_\theta(\xi)$ is a slice at angle $\theta$ through the two-dimensional Fourier transform $\tilde{O}(K_x,K_y)$ of $O(x,y)$ as shown in FIG. 1b. Thus, the projections $P_\theta(\xi)$ yield, upon Fourier transformation, an ensemble of slices of the two-dimensional Fourier transform $\tilde{O}(K_x,K_y)$ of $O(x,y)$. $O(x,y)$ can then readily be reconstructed from this ensemble of slices via its Fourier integral representation expressed in circular polar coordinates. In particular, one finds that $$O(x,y) \approx 1/(2\pi)^2 \int_0^\pi d\theta \int_{-W}^{W} dK |K| \tilde{P}_\theta(K) e^{iK[x\cos\theta + y\sin\theta]}, \tag{2}$$

where $$\tilde{P}_\theta(K) = \int_{-\infty}^{\infty} d\xi P_\theta(\xi) e^{-iK\xi} \tag{3}$$

is the one-dimensional Fourier transform of $P_\theta(\xi)$. In Equation (2), the K integration is limited to the interval $-W$ to $W$ since, in any application, $\tilde{P}_\theta(K)$ will be known only over a finite bandwidth which is taken to be $-W$ to $W$. Because of this restriction, the resulting reconstruction is a low pass filtered version of $O(x,y)$.

In practice, in place of the Fourier integral representation given in Equation (2), a technique known in the art as the filtered backprojection algorithm is used to reconstruct $O(x,y)$. Defining the filter function $$h(t) = 1/2\pi \int_{-W}^{W} dK |K| e^{-iKt} = \tag{4}$$

$$\frac{1}{\pi} W^2 [\sin(KW)/KW] - \frac{1}{2\pi} W^2 [\sin(KW/2)/(KW/2)]^2,$$

which, when convolved with a low pass filter, is known in the art as the standard X-ray tomography deblurring filter, it can be shown (see, for example, A. C. Kak, "Computerized Tomography with X-ray Emission and Ultrasound Sources"; *Proc. IEEE* 67, pp. 1245–1272 (1974)) that Equation (2) can be written in the form $$O(x,y) \approx 1/2\pi \int_0^\pi d\theta Q_\theta(x\cos\theta + y\sin\theta), \tag{5}$$

where $Q_\theta(t)$, called "filtered projections", are given by $$Q_\theta(t) = \int_{-\infty}^{\infty} P_\theta(\xi) h(t - \xi) d\xi. \tag{6}$$

The process of reconstructing $O(x,y)$ according to the prior art thus consists of first filtering the projections with the filter function $h(t)$ and then backprojecting the filtered projections.

The process of backprojection used in the prior art consists of assigning any given pixel value $(x,y)$ within the image array the value of the filtered projection $Q_\theta(t)$ at the point $$t = x\cos\theta + y\sin\theta. \tag{7}$$

Backprojection at any given view angle $\theta$ thus results in a partial image consisting of parallel straight lines as defined by Equation (7) with the grey level of each line being assigned the value $Q_\theta(t)$. Following the process of backprojection at a fixed view angle, the entire process (filtering followed by backprojection) is repeated at different angles and the resulting partial image arrays are added pixel by pixel onto the previously existing partial image (hence, the integral over $d\theta$ in Equation 5). In this manner, the profile of the object is reconstructed. In practice, of course, the filtered projection is only known for a finite number of angles so that a discrete approximation (e.g. a summation) to the backprojection integral Equation (5) is employed.

The success of transmission computed tomography clearly depends on the availability of the projections $P_\theta(\xi)$. In X-ray tomography, these projections are available in the form of measurements of the log amplitude [$\frac{1}{2}$ log (intensity)] of the electromagnetic field produced when a plane, monochromatic X-ray beam propagating along the $\eta$ axis is incident to the object as is illustrated in FIG. 2a. At X-ray wavelengths ($\approx 1$ Å) the incident plane wave suffers very little scattering (refraction or diffraction) in passing through the object. Absorption does occur, however, so that the negative of the log amplitude of the field along the line $\eta = l_0$ is simply the integrated value of the X-ray absorbtion coefficient $\mu(x,y)$ along the travel path (i.e. along the straight line $\xi$=constant). The object profile $O(x,y)$ in this case is then $\mu(x,y)$ and the projections $P_\theta(\xi)$ are simply the negative of the log amplitude of the electromagnetic field as measured along the line $\eta = l_0$.

In ultrasonic tomography, the wavelength is considerably greater ($\approx 1$ mm.) than that of X-rays so that an acoustic wave experiences scattering, in the form of refraction and diffraction, in the process of propagating through an object. The log amplitude of the acoustic field along the line $\eta = l_0$ resulting from an insonifying plane wave propagating along the $\eta$ axis is then not simply the projection of the acoustic absorbtion coefficient along the line $\xi$=constant as is the case in X-ray tomography. This breakdown in the relationship between measured log amplitude and projections of the absorbtion coefficient is one of the major reasons why conventional computed tomography is of limited use in ultrasonic applications.

Although it is not possible, in general, to obtain an exact expression for the acoustic field generated by the interaction of an insonifying plane wave with an acoustic (diffracting) object $O(x,y)$, expressions within the so-called first Born and Rytov approximations are available.

The Born and Rytov approximations are essentially "weak scattering" approximations and, as such, will be valid for cases where the deviations of the object profile $O(x,y)$ from zero are small. Which approximation, Born or Rytov, is employed depends upon the specific application, although the Rytov approximation is generally thought to be superior in medical ultrasound tomography (See, for example, M. Kaveh, M. Soumekh and R. K. Mueller, "A Comparison of Born and Rytov Approximations in Acoustic Tomography", *Acoustical Imaging*, Vol. 11 Plenum Press New York, (1981).) A more complete treatment of the Born and Rytov approximations is found in A. J. Devaney, "Inverse Scattering Theory Within the Rytov Approximation," *Optics Letters* 6, pp. 374-376 (1981). Within these approximations, it has been shown by the inventor in "A New Approach to Emission and Transmission CT" 1980 *IEEE Ultrasonics Symposium Proceedings*, pp. 979-983 (1980); "Inverse Scattering Theory Within the Rytov Approximation" *Opics Letters* 6, pp. 374-376 (1981); and by R. K. Mueller, et al., "Reconstructive Tomography and Application to Ultrasonics", *Proc. IEEE* 67, pp. 567-587 (1979), that for an incident monochromatic plane wave propagating along the $\eta$ axis, the profile $O(x,y)$ is related to the processed signals $D_{\theta 0}(\xi,\omega)$ (hereinafter referred to as "data") taken along the line $\eta = l_0$ via the equation $$\int_{-\infty}^{\infty} d\xi D_{\theta_o}(\xi,\omega)\exp(-i\kappa\xi) = \qquad (8)$$

$$\int\int dxdy O(x,y)\exp(-i[\kappa\xi + (\sqrt{k^2 - \kappa^2} - k)\eta]),$$

where the variable $\kappa$ can assume all values in the range $[-k,k]$. Here $\theta_0 = \theta + \pi/2$ is the angle that the wave vector of the insonifying plane wave makes with the x axis, $\omega$ is the angular frequency, and $k = 2\pi/\lambda$ is the wavenumber of the insonifying acoustic field. The data $D_{\theta 0}(\xi,\omega)$, are shown in the case of the Born approximation, to be simply related to the complex amplitude of the scattered field portion of the acoustic field evaluated along the line $\eta = l_0$ and, in the case of the Rytov approximation, to the difference in the complex phase of the total field and incident field evaluated along this same line.

For discussion regarding diffraction tomography, it is convenient to introduce two unit vectors;

$$\underline{S} = 1/K(\kappa\hat{\xi} + \sqrt{k^2 - \kappa^2}\,\hat{\eta}), \qquad (9a)$$

$$\underline{S}_o = \hat{\eta}, \qquad (9b)$$

where $\hat{\xi}$ and $\hat{\eta}$ are unit vectors along the $\xi$, $\eta$ axes. The unit vector $\underline{s}_0$ is simply the unit propagation vector of the insonifying plane wave. For values of $|\kappa| < k$, Equation (8) can be expressed in terms of $\underline{s}$ and $\underline{s}_0$ in the form $$\widetilde{D}_{\theta_o}(\kappa,\omega) \equiv \int_{-\infty}^{\infty} d\xi D_{\theta_o}(\xi,\omega)e^{-i\kappa\xi} = \int\int dxdy O(x,y)e^{-ik(\underline{s}-\underline{s}_0)\cdot\underline{r}}. \qquad (10)$$

From Equation (10) it may be concluded that the one-dimensional Fourier transform $\widetilde{D}_{\theta 0}(\kappa,\omega)$ of $D_{\theta 0}(\xi,\omega)$ is equal to the two-dimensional Fourier transform $\widetilde{O}(K_x,K_y)$ of the profile $O(x,y)$ evaluated over the locus of points defined by $$\underline{K} \equiv K_x\hat{x} + K_y\hat{y} = k(\underline{s} - \underline{s}_0), \qquad (11)$$

where the unit vector s assumes all values for which $\underline{s} \cdot \underline{s}_0 > 0$. Equation 10 may thus be seen as the diffraction tomography equivalent of the projection slice theorem. The K values satisfying Equation (11) for fixed $\underline{s}_0$ with $\underline{s} \cdot \underline{s}_0 > 0$, are seen to lie on a semicircle, centered at $-k\underline{s}_0$ and having a radius equal to k. By changing the direction of propagation of the insonifying plane wave, it is thus possible to sample $\widetilde{O}(K_x,K_y)$ over an ensemble of semicircular arcs such as illustrated in FIG. 2b. The ultrasonic tomographic reconstruction problem then consists of estimating $O(x,y)$ from specification of $\widetilde{O}(K_x,K_y)$ over this ensemble of arcs.

The problem of reconstructing an object profile from specification of its Fourier transform over an ensemble of circular arcs such as shown in FIG. 2b is an old one, with proposed solutions having first occurred in X-ray crystallography, H. Lipson and W. Cochran, *The Determination of Crystal Structures* (Cornell University Press, Ithica, N.Y., 1966), and later in inverse scattering applications using both X-rays, B. K. Vainshtein, *Diffraction of X-rays by Chain Molecules* (John Wiley, New York, 1977), and visible light, E. Wolf, "Three-dimensional Structure Determination of Semi-Transported Objects from Holographic Data", *Optics Comm.*, pp. 153-156 (1969). More recently, these inverse scattering solutions have arisen in ultrasonics, (see e.g. S. J. Norton and M. Linzer, "Ultrasonic Reflectivity Imaging in Three Dimensions: Exact Inverse Scattering Solutions for Phase, Cylindrical and Spherical Apertures," *IEEE Trans Biomed. Eng. BME*-28, pp. 202-220 (1981)) and also in ultrasonic tomography which has become known as diffraction tomography to distinguish it from conventional tomography where diffraction effects are not taken into account. In all of these applications, the reconstruction of the profile $O(x,y)$ is made possible by the fact that by varying $\underline{s}_0$ over the unit circle, one can determine $\widetilde{O}(K_x,K_y)$ at any point lying within a circle, centered at the origin and having a radius equal to $\sqrt{2}k$. A low pass filtered version $O_{LP}(x,y)$ of $O(x,y)$ can then be obtained by means of the Fourier integral representation $$O_{LP}(\underline{r}) = \frac{1}{2\pi^2} \int_{\underline{K} \leq \sqrt{2k}} d^2K \widetilde{O}(\underline{K}) e^{i\underline{K}\cdot\underline{r}} \qquad (12)$$

where vector notation is used such that $\underline{r} = (x,y)$, $\underline{K} = (K_x,K_y)$ and $d^2K$ stands for the differential surface element in $\underline{K}$.

In any application, the profile $O(\underline{r})$ will vanish beyond some finite range so that a Fourier series expansion for $O_{LP}(\underline{r})$ can be used in place of the Fourier integral (12). According to the solutions proposed in the art, in the Fourier series expansion, the transform $\tilde{O}(\underline{K})$ must then be known for $\underline{K}$ values lying on a regular, square sampling grid in $\underline{K}$ space. To obtain the requisite sample values therefore requires that either one interpolate $\tilde{O}(K_x, K_y)$ from the sample values given on arcs over which this quantity is known (interpolation method) or alternatively, that one select propagation directions $s_0$ such that at least one arc falls on every required sample point in the array (direct sampling method). Discussion and examples of the interpolation method can be found in W. H. Carter, "Computerized Reconstruction of Scattering Objects from Holograms", *J. Opt. Soc Am* 60., pp. 306–314 (1976), while the direct sampling method procedure is followed in e.g. A. F. Fercher et al., "Image Formation by Inversion of Scattered Field Data: Experiments and Computational Simulation", *Applied Optics* 18, pp. 2427–2431 (1979).

Both the interpolation and direct sampling methods for obtaining sample values of $\tilde{O}(\underline{K})$ over a regular square sampling grid have serious drawbacks. Interpolation of $\tilde{O}(\underline{K})$ from sample values given on semicircular arcs suffers from the same limitations as does interpolation from slices in $\underline{K}$ space. Reconstructions based on two-dimensional Fourier Transforms from interpolated sample values in conventional tomography are well known to be inferior in accuracy to those obtained via filtered backprojection. Direct sampling methods, on the other hand, are undesirable because they generally require an extremely large number of $s_0$ values (i.e., many experiments). In addition, both procedures place severe if not insurmountable demands on the experimentalist in that they require extreme accuracy in registering data collected from repeated tomographic procedures.

The present invention is a great improvement over the prior art in that a method and system are provided which allow the low pass filtered object profile $O_{LP}(r)$ to be reconstructed directly from processed signals $D_{\theta_0}(\xi, \omega)$ without the necessity of first determining $\tilde{O}(\underline{K})$ over a regular square sampling grid in $\underline{K}$ space as was required in the prior art. The provided methods and systems employ the so-called filtered backpropagation algorithm (so named by the inventor) which is closely analogous to the filtered backprojection algorithm of conventional transmission tomography. The two techniques differ in one important respect: in the backprojection process the filtered projections $Q_\theta(t)$ are continued back through the object space along parallel straight line paths; whereas in the process of backpropagation, the filtered phases are continued back in the manner in which they were diffracted. In other words, in the backprojection process, the points along a wave of energy may each be considered to follow straight parallel paths through the object. In the backpropagation process, the points are each considered to undergo scattering throughout the object. For example; the Rytov and Born approximations permit an analysis of the problem by suggesting that only first scatterings be taken into account, and that secondary scatterings may be ignored as insignificant. Thus, in backpropagation, quantities $\tilde{Q}(t)$, related to the data $D_{\theta_0}(\xi, \omega)$ through the filtering operation of equation (6), are mapped onto the object space via an integral transform that is the inverse of the transform that governs phase propagation within the Rytov approximation. It is natural then to call this process backpropagation since it corresponds mathematically to the inverse of the usual forward propagation process. The relationship which is employed and embodied in the filtered backpropagation technique has been conveniently denoted by the inventor as the filtered backpropagation algorithm to emphasize its formal similarity to the filtered backprojection algorithm of conventional tomography.

Thus, for purposes of this application and the claims herein, the term "backpropagation" shall be defined to mean that operation that is the inverse or approximate inverse of a forward propagation process. The term "filtered backpropagation technique" shall be defined to describe any diffraction tomographic technique for the partial or complete reconstruction of an object where a filtered real or complex amplitude and/or filtered real or complex phase of a wave is backpropagated into the object space; i.e., is propagated back into object space according to the inverse or approximate inverse of the way in which the wave was originally diffracted. The filtered backpropagation technique is usually implemented in the form of a convolution of filters. For purposes of brevity, such an implementation will identically be called the filtered backpropagation technique. A "backpropagation filter" shall be defined to describe that filter of the filtered backpropagation technique which accounts for diffraction in the backpropagation of the phase; e.g. in ultrasound diffraction tomography, the filter of the filtered backpropagation technique which is not the standard X-ray tomographic filter (or a variation thereon). A "filtered backpropagation operation" shall be defined as any procedure which employs the filtered backpropagation technique. Also, for purposes of this application and the claims herein, it should be understood that the waves of energy which propagate and diffract according to the invention include but are not limited to sonic or electromagnetic waves. The term "sonic wave" shall be interpreted as broadly as possible and shall be understood to include all elastic wave phenomena in liquid and solid materials including, but not limited to, acoustic, compressional, shear, and elastic waves. The term "acoustic wave" shall be interpreted herein to be the equivalent of "sonic wave". The term "electromagnetic wave" shall also be interpreted in its broadest sense and shall include, but not be limited to infrared rays, X-rays, and the class known as "optics".

SUMMARY

In accordance with the present invention, a system for reconstruction of an object is comprised of means for obtaining signals which are a function of the phase and amplitude of a diffracting propagating wave which has passed through an object, and filter means for converting the obtained signals by means of a filtered backpropagation technique into an array representing the partial reconstruction of the investigated object. More particularly, the signals required to practice the invention may be obtained from a tape of analog or digital signals gained from one or more tomographic procedures, or from other suitable means.

A diffraction tomographic system is comprised of a continuous or pulsed source of wave energy, a detecting system for the measurement of the amplitude and/or phase of the diffracted field resulting from the wave energy interacting with a two or three-dimensional obstacle (object), and a filtering system for processing the measured data according to a filtered backpropagation technique, to thereby generate arrays which are used to reconstruct properties of the object. The wave energy provided may be in the form of plane, spherical or cylindrical waves. The detecting system can be comprised of a single detecting element which is scanned over a detecting surface or, alternatively, can be comprised of an array of elements distributed over the detecting surface.

The filtering system disclosed may include a subsystem for preprocessing the received waveforms, a subsystem for implementing a filtered backpropagation technique and thereby performing a partial reconstruction of the object from limited data, a subsystem for integrating a number of partial reconstructions so as to obtain as complete a reconstruction as possible from all available data, and a subsystem for displaying the reconstruction.

One set of preferred embodiments of diffraction tomography systems and methods disclosed herein applies to ultrasound transmission computed tomography. An ultrasound source directs a plane wave of ultrasonic energy into the body being examined. The body is interposed between the ultrasound source and the detecting system. The detecting system records the pressure field produced over a detecting plane as a function of time. For continuous sine wave sources, each detector element receives a simple sine wave of specific amplitude and phase. For pulsed wave sources, each detector receives a pulsed wave which will, in general, differ in amplitude and shape from the insonifying pulse. The sources, the object and the detector system are configured so as to allow either the object being insonified to rotate about a specified axis, or alternatively, to allow the ultrasound source and detector surface to rotate about such a specified axis denoted as the axis of rotation of the system.

For objects whose acoustic properties do not vary appreciably along the axis of rotation of the system ("two-dimensional" objects), the detector system may comprise a linear array of detector elements aligned along a line lying in the plane of rotation of the system (the measurement line). Alternatively, a single detector element can be scanned along the measurement line. For a two-dimensional object, the detected waveforms are used to reconstruct the acoustic velocity and/or attentuation profiles of the object preferably as follows: The analog electrical outputs from the detecting system are converted to digital signals, Fourier transformed in time, normalized, and the normalized signals are processed in such a way as to obtain their unwrapped complex phase. The unwrapped complex phase is input to the subsystem implementing the filtered backpropagation technique. In this subsystem, the unwrapped phase is filtered with a filter function which, in the frequency domain, is the product of the standard X-ray deblurring filter with the backpropagation filter. The backpropagation filter is non-stationary, being dependent on the perpendicular distance of the coordinate point at which a reconstruction is performed from the measurement line. For any given angular orientation between the tomographic system and object (view angle), one filtered backpropagation operation (implementation of the filtered backpropagation technique). yields a two-dimensional image array which represents the partial reconstruction of the object as determined at the particular view angle employed. This image array is then interpolated onto a master image array whose orientation is fixed in space and independent of the view angle. By repeating the entire sequence of steps for a number of view angles and adding the partial reconstructions so obtained in each step to the master array, a complete rendition of the (two-dimensional) object profile is obtained and may be displayed on a computer-graphics display system.

Another group of ultrasound transmission computed diffraction tomography systems and methods disclosed herein applies to three-dimensional objects whose acoustic properties vary significantly along the axis of rotation of the system. In this configuration, a two-dimensional array of detector elements may be placed along a plane lying perpendicular to the plane of rotation of the system (the measurement plane). Alternatively, one or more detector elements can be scanned over the measurement plane. In the preferred embodiment, the analog electrical outputs from the detecting system are converted to digital signals, Fourier transformed in time and normalized, and the normalized signals are then processed in such a way so as to obtain a one-dimensional projection of the unwrapped complex phase of the transformed signals onto the line formed by the intersection of the measurement plane with the plane of rotation of the system.

The projected unwrapped complex phase is input to the subsystem implementing the filtered backpropagation technique which is identical to that used for two-dimensional objects described above. The partial image obtained from the filtered backpropagation operation is then interpolated onto a master image array whose orientation is fixed in space and independent of view angle. By repeating the entire sequence of steps for a number of view angles and adding the partial reconstruction so obtained in each step to the master image array, a complete rendition of the planar projection of the object onto the plane of rotation of the system is obtained. By changing the plane of rotation of the system (the planar orientation), any planar projection of the object can be obtained. The complete three-dimensional object can itself be reconstructed from a sufficient number of planar projections so obtained, if desired. Again, the partial reconstruction or the entire three-dimensional reconstruction may be displayed as desired.

The present invention also applies to X-ray transmission computed tomography and especially to what is known in the art as "soft" X-rays which have longer wavelengths than standard X-rays. In this embodiment, a quasi-monochromatic X-ray source is arranged opposite an X-ray detecting system. An object is interposed between the source and detecting system and the system is configured to allow relative rotation between the object and source/detector(s). The detected X-ray amplitude is employed to reconstruct a planar cross section of the X-ray attenuation profile of the object being examined.

As described above, the invention is embodied in numerous ways. Thus, for ultrasound computed tomography, two or three-dimensional image reconstructions can be obtained. For X-ray transmission computed tomography, a two-dimensional image may be obtained. Moreover, continuous or pulsed sources, and different detector systems may be used.

Another set of embodiments of the invention is provided by electromagnetic or sonic well-to-well tomography. In these geophysical embodiments, one or more sources of electromagnetic or sonic waveforms are placed in a borehole. One or more detectors of electromagnetic or sonic waveforms are placed in a second borehole. The waveforms received in the second borehole are then used to reconstruct the velocity and/or attenuation profile of the formation between the two boreholes. In the borehole to borehole (well to well) situation, only a two-dimensional reconstruction is possible due to the impossibility of rotating either the object (formation) or the sources and detectors.

Yet another set of embodiments of the present invention involves subsurface electromagnetic or seismic exploration where electromagnetic or sonic sources are placed on the earth's surface in the immediate vicinity of a borehole and one or more detectors are placed in the borehole. (A second configuration has the detectors on the surface and the sources in the borehole.) The waveforms received by the detectors are used to reconstruct the velocity and/or attenuation profile of the formation existing between the sources and the detectors. Again, due to rotation limitations, only a two-dimensional image may be reconstructed according to the procedures detailed above.

When spherical waves, which are generated by point sources, are used in well-to-well tomography and subsurface seismic exploration, the analog electrical signals produced by the detecting system are converted to digital signals and processed in such a way as to obtain the signal that would have been detected if the transmitted wave were a continuous, cylindrical waveform having a linear phase shift along the transmitter axis. This later signal is then processed so as to obtain its unwrapped complex phase.

The unwrapped complex phase is input to the subsystem implementing the filtered backpropagation technique. This subsystem is similar to that used for ultrasound transmission computed tomography using plane waves described above, but employs a variation of the ultrasound backpropagation filter. Additionally, the standard X-ray deblurring filter is altered substantially. Following the filtered backpropagation operation, the partial image array is transferred to a master image array which may be displayed by suitable means and the entire sequence of steps is repeated for a different choice of linear phase shift. The final two-dimensional image obtained is a rendition of the electromagnetic or acoustic velocity and attenuation profile of the plane section of the formation lying between the two boreholes, or the borehole and the surface, whichever the case may be.

It is thus an object of the instant invention to provide methods and systems for reconstructing acoustic and/or electromagnetic properties of two and three-dimensional objects.

It is another object of the invention to provide diffraction tomography methods and systems for two and three-dimensional object reconstruction for use in ultrasonic medical diagnosis.

It is yet another object of the invention to provide diffraction tomography methods and systems for sonic and/or electromagnetic reconstruction of subsurface earth formations.

BRIEF DESCRIPTION OF THE DRAWINGS

The present invention may be better understood and its numerous objects and advantages will become apparent to those skilled in the art by reference to the detailed description of the preferred embodiments and by reference to the representative drawings wherein:

FIG. 10 illustrates the rotation-interpolation operations in block diagram form.

FIG. 11 is a block diagram illustrating the method inventions.

DETAILED DESCRIPTION OF THE PREFERRED EMBODIMENTS

Ultrasound Diffraction Tomography

Figure 1A:
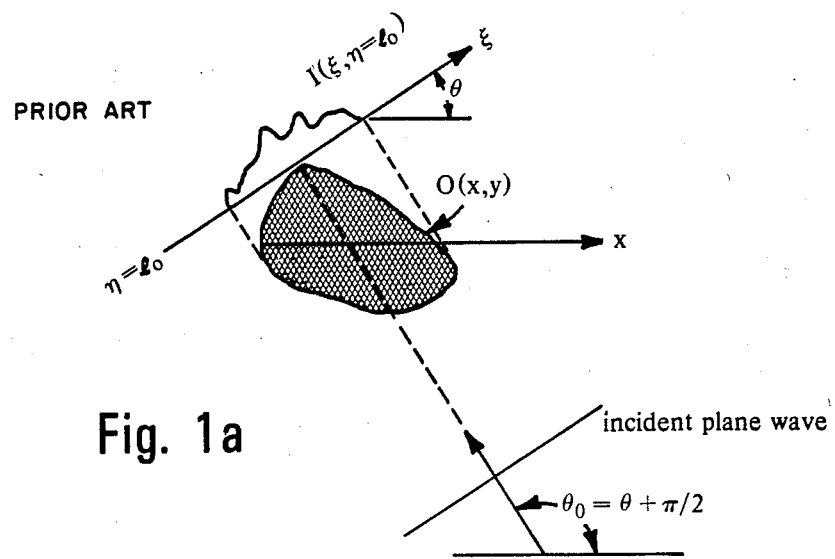
FIG. 1a illustrates the projection obtained in a cartesian coordinate system when conventional parallel beam transmission computed tomography is applied to an object.
Figure 1B:
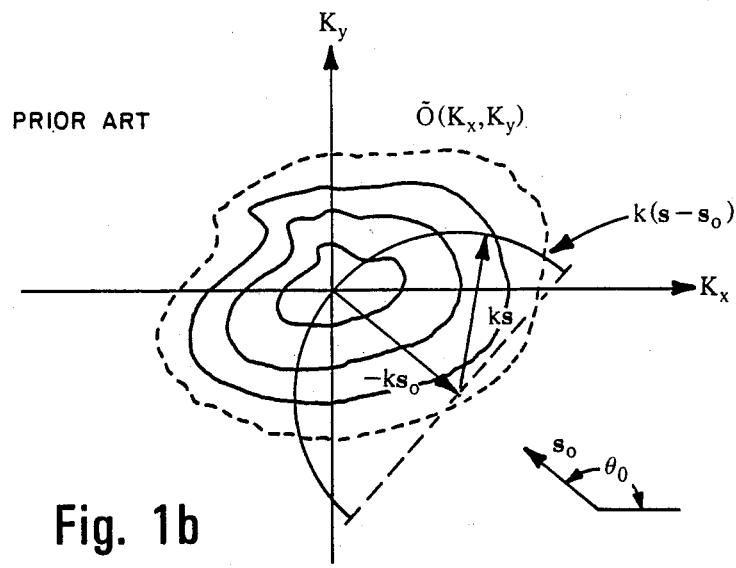
FIG. 1b illustrates a slice through the two-dimensional Fourier transform of an object obtained via the projection slice theorem in conventional parallel beam transmission computed tomography.
Figure 2A:
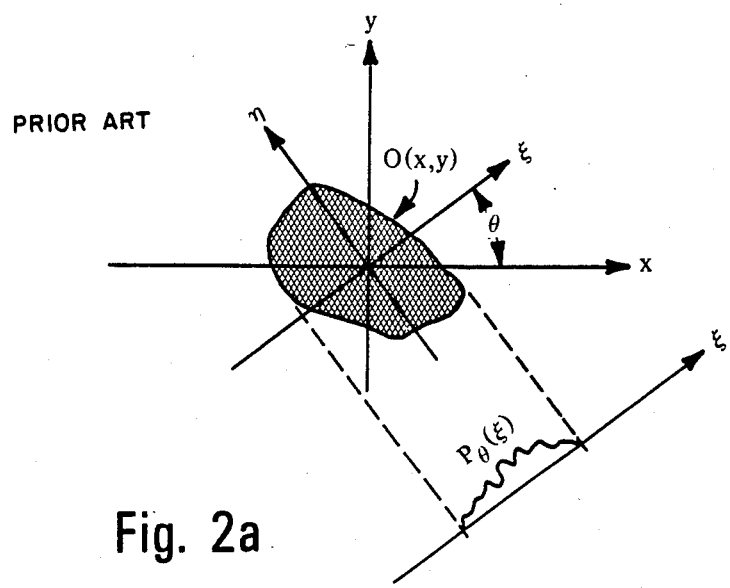
FIG. 2a illustrates the projection of an object in the prior art X-ray tomography.
Figure 2B:
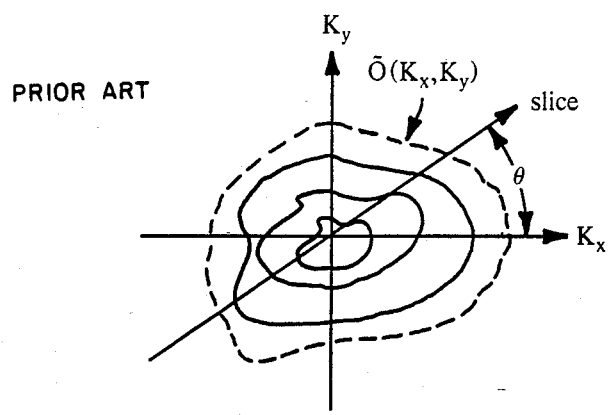
FIG. 2b illustrates the diffraction tomography equivalent of the conventional projection slice theorem where the two-dimensional Fourier transform of an object must be evaluated on an ensemble of circular arcs.
Figure 3:
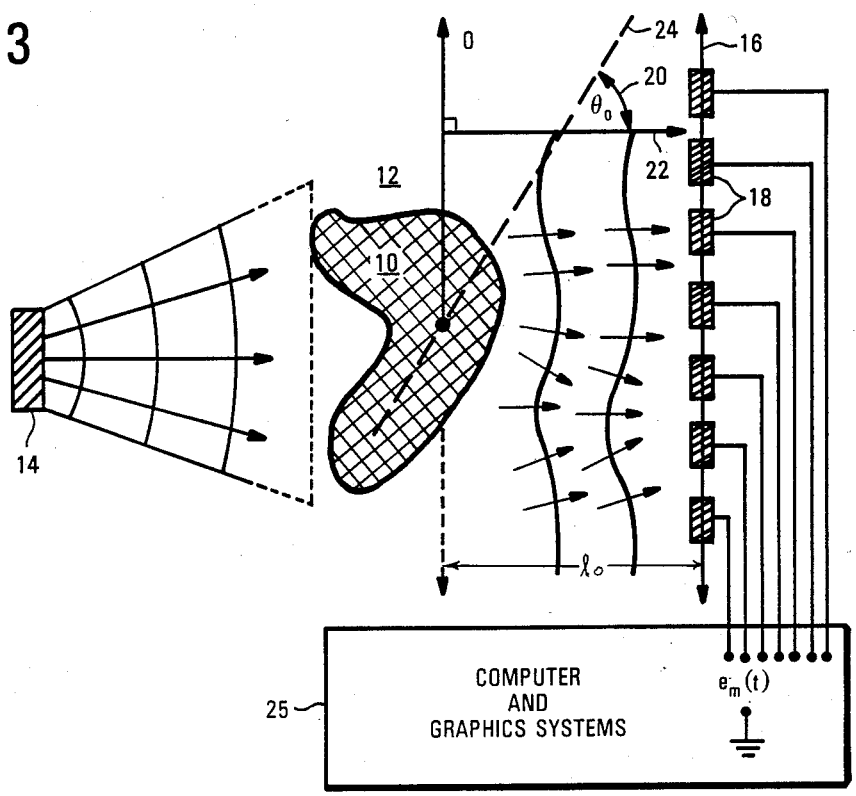
FIG. 3 is a partially schematic and partially block diagram of an ultrasound transmission computed tomographic system of the present invention.

As seen in FIG. 3, an object 10 interposed in a fluid bath 12 is investigated by the ultrasound transmission computed tomographic system of the present invention. An ultrasound source 14 and a detector plane 16 are located on opposite sides of the object. The source 14 is such that the acoustic wave entering the object 10 is approximately a plane wave. This can be accomplished by appropriately positioning a small disk-shaped single transducer element, or by means of a suitably phased planar array of transducer elements, or by any other suitable means. The ultrasound signal leaving the source can be of either a continuous wave or pulsed type. The center frequency of the source is optimally such that the wave length of the pressure field induced in the fluid bath at this frequency is significantly (i.e., on the order of one magnitude or more) smaller than the dimensions of the object being investigated. The detector plane 16 is preferably aligned parallel to the plane wavefront of the insonifying plane wave and contains one or more detector elements 18. In a typical system the transducer elements used for the source 14 and detectors 18 will be piezo-electric crystals.

The system is configured so as to allow rotation between the object, and the detector and source elements of the system, about an axis 0 passing through the object and parallel to the detector plane. For purposes of identification, the plane which is perpendicular to the axis of rotation and which bisects the source, is denoted as the plane of rotation of the system. Thus, in FIG. 3, the plane of rotation is the plane of the paper. Likewise, the angle 20 formed between the direction of propagation of the insonifying plane wave 22, and an arbitrary reference line 24 fixed relative to the object and passing through the axis of rotation in the plane of rotation, is denoted as the view angle $\theta_0$.

After the insonifying wave propagates through the object, the resulting diffracted field is detected by one or more detector elements 18 on the detector plane 16. The detectors 18 are preferably transducers which output electrical signals $e_m(t)$ (the voltage at the m'th detector over time). These signals are input into computer and graphics systems 25 which implement a filtered backpropagation technique, generate a partial reconstruction of the object, and display the results.

Figure 4:
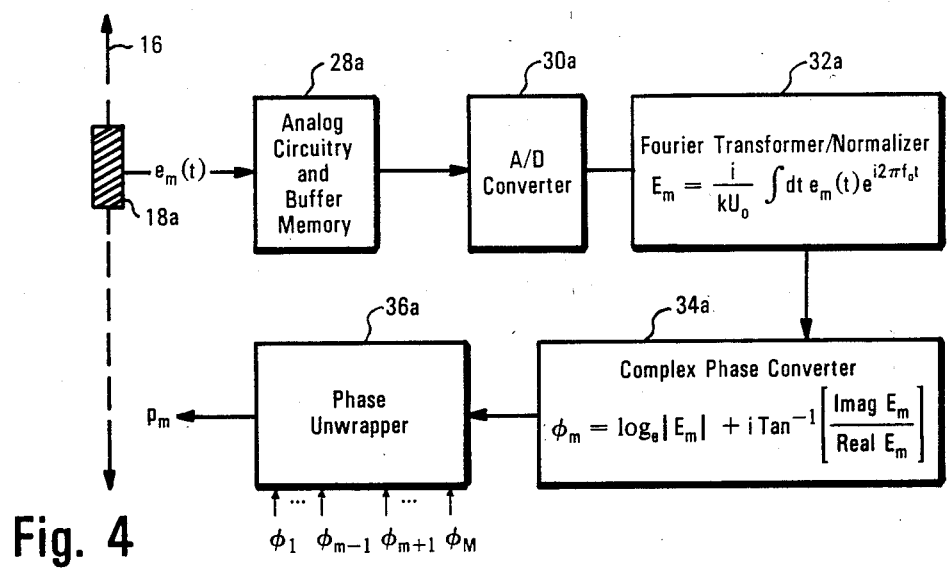
FIG. 4 is a block diagram of the preprocessing performed on detected signals in the two-dimensional object system embodiment.

One configuration of the systems disclosed herein is represented in FIG. 4, where the acoustic properties of an object do not vary appreciably along the axis of rotation of the system. In these two-dimensional objects, the axis of symmetry of the object is the axis of rotation of both the object and the source-detector system. The detecting system of the preferred embodiment in this case consists of a linear array of M elements evenly spaced over the measurement line—this line being formed by the intersection of the detector plane 16 with the plane of rotation of the system. The detector elements 18a are separated by a distance approximately equal to the fluid bath wavelength $\lambda_0$ corresponding to the center frequency $f_o$ of the insonifying plane wave.

As shown in FIG. 4, the output signals $e_m(t)$ from transducers 18a are preprocessed by inputting them, if required or desired, into analog electronic circuitry and a buffer storage system 28a for prefiltering, calibration and temporarily storing the analog electrical signals in preparation for analog to digital conversion. A/D converter 30a converts the stored analog signals into digital format. In one embodiment of the present invention, the digitized electrical signals are then Fourier transformed in time and normalized by suitable means 32a according to the equation $$E_m = \frac{i}{kU_o} \int dt\, e_m(t) e^{i2\pi f_o t} \tag{13}$$

where $U_o$ is the amplitude of the insonifying wave at its center frequency $f_o$, and k is the wavenumber in the fluid bath at this frequency. The frequency (transform variable) has been set equal to the center frequency $f_o$ of the insonifying waveform as those skilled in the art will recognize, because the insonifying wave output by source 14 may be a pulse which is comprised of many sine waves at different amplitudes, phases and frequencies. By choosing the center frequency, a constant frequency is employed which will provide the amplitude and phase of the signal at an optimal signal to noise ratio.

After transformation and normalization, electrical output signals $E_m$ are further preprocessed by converting them to a complex phase $\phi_m$ by suitable means 34a according to the following operations:

$$\text{Real } \phi_m = \log_e |E_m| \tag{14a}$$

$$\text{Imag}\phi_j = \text{ArcTan}\left[\frac{\text{Imag } E_m}{\text{Real } E_m}\right] \tag{14b}$$

were the principle value of the arc tangent is computed. For each value of m, the quantity $\phi_m$ represents the principle value of the complex phase of the pressure field at frequency $f_o$ at the spatial position of the m'th detector element. The usefulness of complex phase converter 34a may be understood by realizing that when an energy wave goes through a diffracting body, the body has two effects: It attenuates the waves and thus changes the amplitude; and it changes the phase of the wave. Thus, the complex phase converter 34a manipulates the incoming data so that the amplitude information is contained in Real $\phi_m$ and the phase shift is found in Imag $\phi_m$.

After the electrical signals are converted into complex phases $\phi_m$, these complex phases are phase unwrapped at 36a and the unwrapped phase array $p_m$ is used to perform a partial reconstruction of the object. Phase unwrapping is desirable because complex phase converter 34a treats input values such as 0, $2\pi$ and $4\pi$ alike, and therefore the output from converter 34a does not necessarily reflect the proper signal. Phase unwrapper 36a, however, as seen in FIG. 4 by its additional inputs, utilizes the knowledge that the shift between adjacent points cannot be too large (i.e. $>2\pi$), and therefore corrects the phase array. Any standard phase unwrapper may be employed for these purposes.

Figure 5:
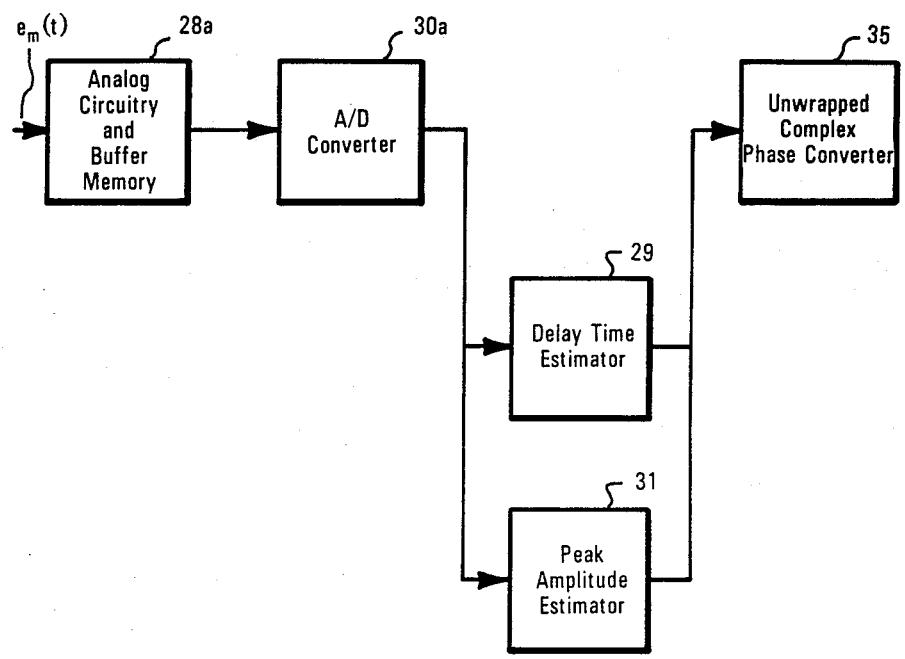
FIG. 5 is a block diagram of the preprocessing performed on detected signals in an alternative preferred embodiment.

Another manner of preprocessing signals $e_m(t)$ concerns the cases where the pulse duration of the insonifying plane wave is very short. In this situation the electrical signals $e_m(t)$ from the detector array are processed and stored at 28a, A/D converted at 30a and then input into a preprocessing system which may utilize software to estimate the total delay time $\zeta_m$ between the pulse received at the detector and the transmitted pulse. The peak amplitude of the received pulse $A_m$ is also estimated. A block diagram of the preprocessing steps in this embodiment is shown in FIG. 5.

After $\zeta_m$ and $A_m$ are calculated at 29 and 31 respectively, the unwrapped complex phase $p_m$ is approximately determined at 35 via the relationships Real $p_m \approx \log_e A_m$, (15a)

Imag $p_m \approx \omega_o \zeta_m$, (15b)

where $\omega_o = 2\pi f_o$ is the center frequency of the insonifying pulse. The above two relationships are only approximate but, nevertheless, provide good approximations in cases where the total pulse duration is very short. In addition, the approximation obtained for Imag $p_m$ can be used, if desired, to aid in the phase unwrapping operation 36a required in the embodiment discussed above.

Yet another manner of preprocessing signals $e_m(t)$ concerns cases where the Born approximation for the interaction between the insonifying wave and object is employed. For such cases the normalized, Fourier transformed transducer output signals $E_m$ are processed according to the equations $$p_m = e^{-ikl_o}E_m - \frac{i}{k} \qquad (16)$$

where k is the wavenumber of the insonifying acoustic field and $l_o$ is the perpendicular distance from the center of rotation of the object to the detector array, to yield the array of complex numbers $p_m$.

Figure 6:
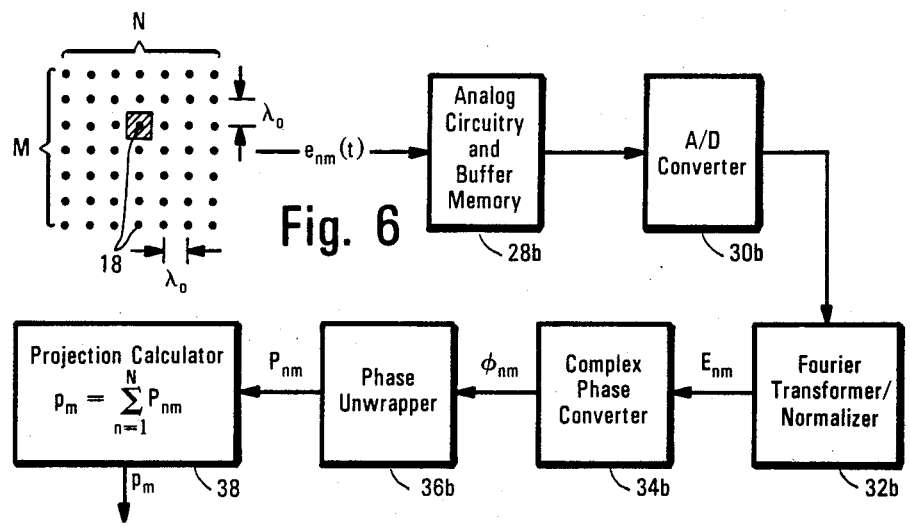
FIG. 6 is a block diagram of the preprocessing performed on detected signals in the three-dimensional object system embodiment.

A second configuration of the systems disclosed herein applies to objects whose acoustic properties vary appreciably along the axis of rotation of the system (3-D objects). In the preferred embodiment of this configuration, as seen in FIG. 6, the detecting system consists of a rectangular NXM array of transducer elements 18 evenly spaced over the detector plane 16. The centers of the detector elements are separated by a distance on the order of the wavelength $\lambda_0$ corresponding to the center frequency $f_o$ of the insonifying wave. The electrical signals generated by the detector elements are input into the analog electronic circuitry and a buffer storage system 28b which prefilters, calibrates and temporarily stores the analog electrical signals in preparation for the A/D conversion. After A/D conversion at 30b, the digitized electrical signals from the transducer elements are used to calculate the two-dimensional unwrapped phase array $P_{nm}$ of the pressure field at the detector locations. Again, as in the case of two-dimensional objects, the preprocessing of the digitized signals can be performed in three different preferred manners.

In one of the preferred manners, the signals are digitized, Fourier transformed in time and normalized at 32b and the principle valued complex phase $\phi_{nm}$ corresponding to each detector location on the detector plane is calculated at 34b in the same manner as $\phi_m$ was calculated in the two-dimensional configuration. After the signals are converted into complex phases $\phi_{nm}$, the two-dimensional array of complex phases are phase unwrapped at 36b to yield the unwrapped phase array $P_{nm}$.

A second preferred embodiment of the three-dimensional configuration applies to cases where the pulse duration of the insonifying pulse is very short. In this embodiment, the digitized electrical signals $e_{nm}(t)$ from the detector array are preprocessed so as to yield the delay time $\zeta_{nm}$ and peak amplitude $A_{nm}$ of the received pulses. These quantities are then processed according to the equations Real $P_{nm} \approx \log_e A_{nm}$, (17a)

Imag $P_{nm} \approx \omega_o \zeta_{nm}$, (17b)

to yield approximate values of the unwrapped complex phase array $P_{nm}$.

A third preprocessing method applies when the Born approximation is employed. For this case, the complex array $P_{nm}$ is calculated according to the equations $$P_{nm} = e^{-kl_o}E_{nm} - \frac{i}{k} \qquad (18)$$

and the $P_{nm}$ are then further processed as described below.

Following the calculation of the two-dimensional unwrapped complex phase array $P_{nm}$, this array is projected onto the line formed by the intersection of the detector plane with the plane of rotation of the system. The one-dimensional array representing the projected unwrapped complex phases in the three-dimensional system is denoted by $p_m$ and is calculated by summing the unwrapped phase array column fashion according to $$p_m = \sum_{n=1}^{N} P_{nm} \qquad (19)$$

as seen at 38. This one-dimensional array $p_m$ is used to perform a partial reconstruction of the object. The projection of the two-dimensional array to arrive at the one-dimensional array $p_m$ is required in performing either a reconstruction of a three-dimensional object profile or a reconstruction of a two-dimensional planar slice of an object.

Additionally, it should be noted that the one-dimensional array used in partially reconstructing the object is identically denoted $p_m$ in both the two-dimensional and three-dimensional configurations. While the notation is identical, as a one-dimensional array is used in the filtered backpropagation technique, the arrays are arrived at differently and contain different information. Those skilled in the art will appreciate that if the three-dimensional embodiment is used on a two-dimensional object to generate array $p_m$, the result after suitable normalization would be identical to the $p_m$ array generated by the preferred two-dimensional system.

Figure 7:
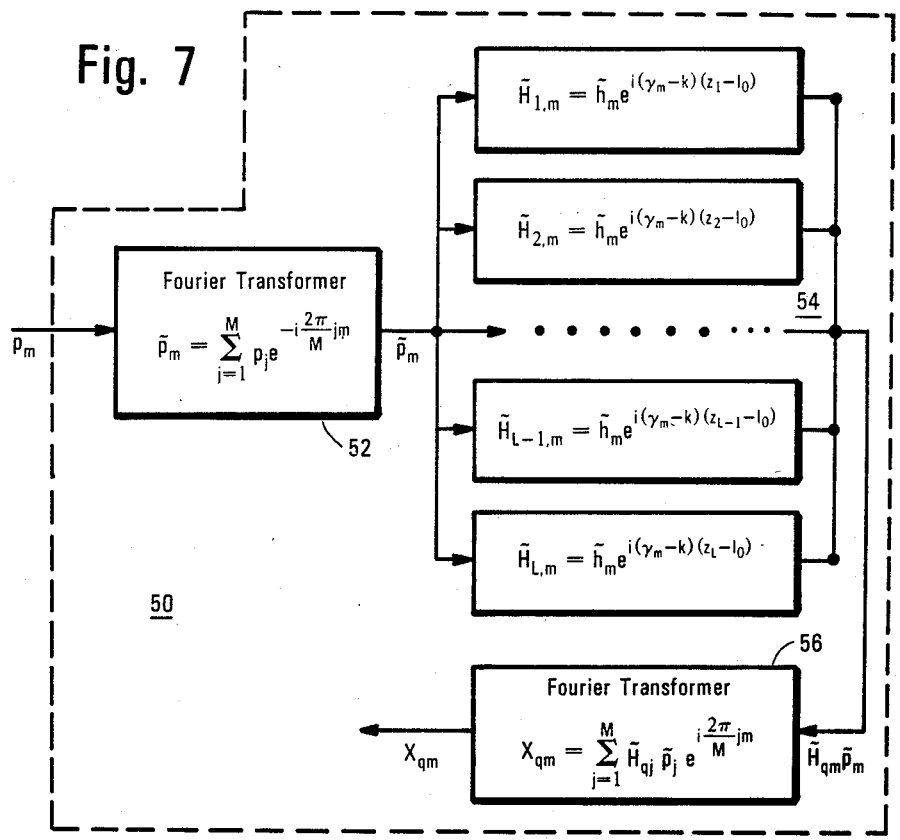
FIG. 7 is a block diagram of the filtered backpropagation technique.

After the above-discussed signal preprocessing, the array of complex numbers $p_m$ (m = 1, 2 ..., M) is input into the backpropagation subsystem 50 as shown in FIG. 7. Subsystem 50 implements the filtered backpropagation technique. In this embodiment, the quantites $p_m$ (m = 1, ..., M) are Fourier transformed at 52 according to the relationship $$\tilde{p}_m = \sum_{j=1}^{M} p_j e^{-i2\pi \frac{jm}{M}} \qquad (20)$$

(where j is a dummy variable) to yield array $\tilde{p}_m$ (m = 1, ..., M). The M complex numbers $\tilde{p}_m$ are then input to the filter bank 54 which performs the filtered backpropagation operation (i.e. implements the filtered backpropagation technique) and generates the two-dimensional array $\bar{H}_{qm}\tilde{p}_m$ (q = 1, 2, ..., L, m = 1, 2, ..., M) where L is the total number of depth samples desired for the object reconstruction. Finally, L one-dimensional Fourier transforms are performed to yield the two-dimensional filtered and backpropagated complex phase $X_{qm}$ according to the relationship $$X_{qm} = \sum_{j=1}^{M} \tilde{H}_{qj} \tilde{p}_j e^{i2\pi \frac{jm}{M}} \qquad (21)$$

where, again, j is used as a dummy variable.

In the filter bank, the two-dimensional array $\tilde{H}_{qm}$ (q=1, 2, ... L) (m=1, 2, ... M) is produced according to the filtered backpropagation technique $$\tilde{H}_{qm} = \tilde{h}_m e^{i(\gamma_m - k)(z_q - l_o)} \qquad (22)$$

The quantities $\tilde{h}_m$ are the standard X-ray tomography smoothing filter, i.e. the Fourier coefficients of a low-pass smoothing filter convolved with an X-ray tomography deblurring filter as discussed above in the Background. The remainder of the filter ($e^{i(\gamma_m - k)(z_q - l_o)}$) is the preferred backpropagation filter which performs the backpropagation operation. $\gamma_m$ are defined as $$\gamma_m = k\sqrt{1 - \left(\frac{m}{M}\right)^2} \qquad (23)$$

with k being the wavenumber associated with the center frequency of the insonifying plane wave. The quantities $z_q$ (q=1, 2, ... L) are the depth coordinates of lines over which the filtered and backpropagated phase is being evaluated, and $l_o$ is the distance between the axis O of the object and the detector plane. Thus, it is seen that the preferred backpropagation filter which is one of the filters of the filtered backpropagation technique, is a non-stationary filter, as it is dependent on object depth $z_q$. The backpropagation filter accounts for the diffraction of waves in the object and permits the object profile to be reconstructed directly from the gathered information without having to use interpolation or direct sampling over a square sampling grid.

Figure 8A:
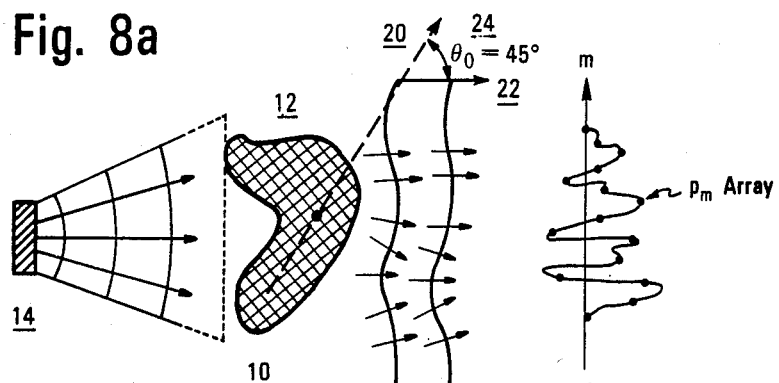
FIG. 8a is an illustration of an array obtained by the ultrasound preprocessing of received signals from an ultrasound transmission computed tomographic system.
Figure 8B:
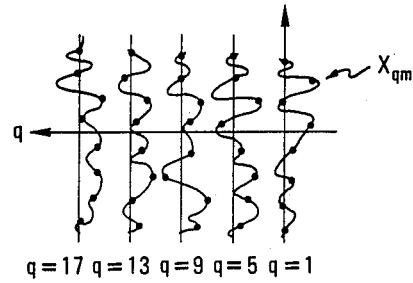
FIG. 8b is an illustration of the results obtained after the arrays of FIG. 8a are filtered by the filtered backpropagation technique of FIG. 7.
Figure 8B:
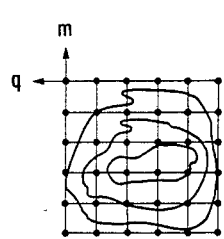
Figure 8B:
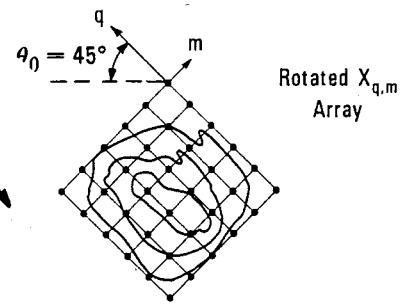

For two-dimensional objects, the $X_{qm}$ array represents the partial reconstruction of the object profile as determined at the particular view angle employed in obtaining the data. For three-dimensional objects, this array represents the partial reconstruction of the planar projection of the object profile onto the plane of rotation of the system. The q index indicates the depth coordinate while the m index indicates the coordinate position along the line of intersection of the plane of rotation of the system with the detector plane. FIG. 8(a) illustrates the $p_m$ array at the M sample points along the line of intersection for the case of a 45° view angle. For the purposes of the illustration, $p_m$ is plotted as a single real array of sample values. In general, $p_m$ is a complex array so that two plots (one for the real part of the array and one for the imaginary part) are required. In FIG. 8(b), a filtered and backpropagated phase array $X_{qm}$ is shown for selected object depth values. Note, that again, $X_{qm}$ is plotted as being a single two-dimensional real array whereas, in practice a two-dimensional complex array would be required.

Figure 9:
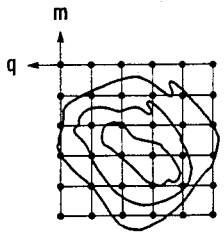
FIG. 9 is an illustration of the rotation-interpolation operations used to provide a more complete reconstruction.

Referring to FIG. 8(b), it is seen that the orientation of the q and m axes will always be the same, independent of the view angle. However, the partial reconstruction of the object represented by the $X_{qm}$ array will depend on the view angle. Thus, as seen in FIG. 9 it is necessary to rotate the $X_{qm}$ array about the axis of rotation of the system by the angle $-\theta_0$ and then interpolate the rotated array onto a master image array which is fixed relative to the object in the plane of rotation of the system. For two-dimensional objects, this master image array represents the ultrasound velocity and attenuation profile of the object. For three-dimensional objects, this array represents the projection of the object's three-dimensional velocity and attenuation profile onto the plane of rotation of the system. A block diagram of the rotation-interpolation operation is given in FIG. 10 wherein $X_{qm}$ is rotated by angle $-\theta_0$ at 111, and interpolated onto the master array at 113. In practice, any interpolation scheme may be employed. The nearest neighbor interpolation technique is well-suited for these purposes.

Finally, by repeating the entire sequence of operations for a new view angle and adding the rotated and interpolated $X_{nm}$ array pixel by pixel onto the master array, a new and improved partial reconstruction of the object (or its planar projection) will be obtained. By repeating this for a number of view angles, a complete rendition of the object (or its planar projection) will be generated. For three-dimensional objects, the plane of rotation of the system can then be changed and the entire sequence repeated to obtain a projection of the object onto a new plane. In this way, any number of planar projections can be obtained from which a complete three-dimensional rendition of a three-dimensional object can be generated using known 3-D tomographic reconstruction techniques. Of course, the master array and if desired, individual $p_m$ arrays may be displayed in both two-dimensional and three-dimensional situations on a screen or as a hard copy as desired.

For two-dimensional objects, the master image array obtained from the filtered backpropagation technique is a complex valued two-dimensional array. Its real part is a rendition of the real part of the object profile while its imaginary part is a rendition of the imaginary part of the object profile. The real part of the object profile carries information primarily about the acoustic velocity profile of the object and may be displayed on a hard copy or video display system by simply displaying the real part of the master image array. The imaginary part of the object profile carries information primarily about the acoustic attenuation profile of the object and may be displayed on a hard copy or video display system by simply displaying the imaginary part of the master image array. Alternatively, the real (velocity) and imaginary (attenuation) profiles may be displayed jointly using a color graphics display system with different colors being used for velocity and attenuation. It should be noted that both the acoustic velocity and acoustic attenuation profiles of tumors are presently important in medical diagnostics of cancer (see, for example, J. F. Greenleaf and R. C. Bah, "Clinical Imaging With Transmissive Ultrasound Computerized Tomography," *IEEE Trans. Biomed. Eng.*, BME-28, 177-185 (1981).)

As in the case of two-dimensional objects, the master image array obtained for any given plane of rotation for a three-dimensional object and system is a complex valued two-dimensional array. Its real part is a rendition of the projection of the real part of the three-dimensional object profile onto the plane of the rotation of the system while the imaginary part is the projection of the imaginary part of the three-dimensional object profile onto the plane of rotation of the system. The real and imaginary parts of the two-dimensional master image array may be displayed separately or jointly on hard copy or video graphics display systems as can be done for two-dimensional objects. The real part of the array carries information primarily about the acoustic velocity profile of the three-dimensional object while the imaginary part carries information primarily about the acoustic attenuation profile of the object.

It is sometimes desirable to display sections (planar slices) of objects such as biological media rather than planar projections of such media. Sections can be reconstructed from a sufficient number of planar projections by means of the three-dimensional projection slice theorem. In the present invention, the planar projections of the three-dimensional object profiles as generated by the filtered backpropagation technique can be used in conjunction with the three-dimensional projection-slice theorem to yield planar sections of the object profile of the three-dimensional body being examined. The planar sections so obtained can then be displayed on a graphics display system in a way entirely analogous to that employed for two-dimensional object profiles.

The planar projections of the object profiles resulting from the filtered backpropagation technique can also be used to obtain an approximate reconstruction of the full three-dimensional object profile. The real and imaginary parts of the three-dimensional profile can then be displayed using known three-dimensional display methods either separately or jointly. Again, as was the case for two-dimensional objects, the real part of the three-dimensional profile carries information primarily about the three-dimensional acoustic velocity profile while the imaginary part carries information primarily about the three-dimensional acoustic attenuation profile.

FIG. 11 depicts in block diagram form the best mode embodiment of the method for tomographic reconstruction of an object using ultrasound transmission computed tomography. The methods of the invention are integrally connected with the systems described above as will be recognized by those skilled in the art. At step 114, a wave of energy is emitted from a suitable ultrasound source toward the object 115 being examined. The diffracted pressure field produced by the interaction of the wave with the object is detected at step 118 by one or more detectors. As the detectors are typically transducers, the detectors produce an analog signals which are functions of the detected field over time. The produced signals are preprocessed in steps 121, 128, 130, 131, 132, 134, 136, and 138 where they are respectively calibrated, stored, converted into a digital signal, normalized and Fourier transformed, complex phase calculated, phase unwrapped and for three-dimensional objects, projected onto the line formed by the intersection of the detector plane with the plane of rotation of the system. As described above, where the pulse duration of the insonifying wave is very short, steps 132, 134 and 136 are omitted, and in their place delay times and peak amplitude are measured and processed to determine the complex phases at 145. Also, for cases involving the Born approximation, these complex phases are readily calculated directly from the output of 132. In all three methods, the preprocessed signals are input into a system which implements the filtered backpropagation technique in steps 152, 154, and 156. Step 152 Fourier transforms the preprocessed signal, which is a one-dimensional array, and step 154 performs the filtered backpropagation technique. Step 156 Fourier transforms the two-dimensional filtered and backpropagated complex phase resulting from step 154 and in doing so generates partial reconstruction of the object as determined at the particular view angle employed in obtaining the data.

In steps 160, 162, and 164, the two-dimensional array which is the partial reconstruction of the object is rotated, interpolated, and stored on the master array. By repeating the method described at a number of view angles and adding the resulting partial reconstructions obtained at each view angle to the master image array, a complete rendition of a two-dimensional object profile or the planar projection of a three-dimensional object profile onto the plane of rotation of the system is obtained. A complete three-dimensional object profile or a planar slice of the object profile can be reconstructed from a sufficient number of planar projections so obtained, if desired. The obtained arrays, slices, projections of profiles, or profiles may be displayed at 166 using suitable display means.

Those skilled in the art will recognize that many permutations and variations may be made in the methods and systems disclosed for the ultrasound computed tomography invention and the disclosed embodiments are not intended to limit the invention in any manner. For example, the detector system may comprise one detector which is scanned over a line for two-dimensional objects or over a plane for three-dimensional objects. Alternatively, the detector system may include a one-dimensional array of detectors for a two-dimensional object or a one-dimensional array that is scanned in a direction perpendicular to the array for a three-dimensional object. A two-dimensional array of detectors may be used for three-dimensional objects. Another possibility would be to use a single large detector which could recognize variations in the diffracted field. Those skilled in the art will recognize other possible detector schemes.

While it is preferable that the detectors be aligned parallel to the plane wavefront of the insonifying plane wave, those skilled in the art will recognize that if desired, the detectors can be placed at an angle and the signals detected can be additionally corrected for the deviation. For example, arrangements as the hereinafter-discussed geophysical tomography embodiments where the sources and detectors are non-parallel and stationary but where the sources are arranged to produce waves of variable phase delay, may be utilized with proper preprocessing in conjunction with the ultrasound diffraction tomography embodiments disclosed herein. Additionally, while it is preferable to set the center frequency of the source so that the wave length of the pressure field induced in the fluid bath is significantly smaller than the dimensions of the object being investigated, wide latitude is permitted and there is no intention to be bound to a range of frequencies. Moreover, while the fluid bath does not comprise part of the invention, those skilled in the art will appreciate that for ultrasonic frequencies, a liquid bath such as water is preferable. This is not to indicate, however, that air or other fluids cannot be used or might not be preferable for other situations. Of course, it may happen that the natural body fluids could constitute the fluid bath.

It will also be appreciated that the analog to digital conversion of the data is not necessary to carry out the invention. If analog signals are used, the filtered backpropagation technique is slightly modified as the Fourier transform and the filter array must be changed to account for the difference in data form. Likewise, other aspects of the preprocessing may be changed, or deleted as desired by those skilled in the art. Additionally, it will be apparent that the filtered backpropagation technique may be altered according to various circumstances. Thus, the filter bank may be split so that array $\bar{p}_n$ is first filtered by an X-ray tomography deblurring filter and then separately filtered according to a backpropagation filter. Moreover, $\bar{p}_n$ can be convolved into a bank of backpropagation filters on a point by point basis rather than as an entire array. The deblurring filtering and/or backpropagation filtering may also be performed in the space domain instead of the frequency domain, as those skilled in the art will appreciate. Further, the backpropagation filter may be mathematically altered as required or desired to provide equivalents which may account for changes in the system.

Those skilled in the art will also appreciate that a plethora of changes may be made to the numerous embodiments and variations disclosed without deviating from the scope of the invention. Additionally, it will be understood that the ultrasound transmission computed tomography systems and methods embodiments of the disclosed invention have broad application. For example, the methods and systems disclosed may be used to improve medical ultrasound imaging to provide better detail of possible cancerous growth in body tissue, fetal imaging for pre-natal prognosis, etc. In these situations, the object being investigated is a human body. The source of plane waves is a standard ultrasonic source which is chosen to have a dominant frequency with a corresponding wave length in the human body on the order of one millimeter. The source is placed against or at some distance from the body and pulsed. In the case of cancer detection, the detectors chosen may be standard piezoelectric crystals (transducers) which are arranged in a linear array located directly against or at some distance from the body on the opposite side of the body from the source. A linear array of detectors may be chosen for use, as a two-dimensional reconstruction of the cancerous tissue is often times of interest (i.e. it is desirable to know whether cancerous tissue exists, and if so, where it is located, but not necessarily its exact shape). The typical analog voltage output of the detector-transducers resulting from the wave diffracting through the body is input into a subsystem which preprocesses the signal which is then filtered according to the filtered backpropagation technique, all as described above. If desired, the preprocessing and the filtered backpropagation technique can both be implemented by computer. The resulting array can be stored in computer memory. Simultaneous with the preprocessing and filtering, the source and detectors are rotated around the investigated body as is well known in the art. The source is again pulsed and the process repeated. The resulting array is interpolated and stored in memory on a master array, if desired. The entire sequence is repeated until a sufficient number of arrays are produced for proper imaging. In some cases, ten arrays will be enough. In other cases, the sequence will be repeated one hundred times. Of course, the more arrays that are produced, the better the resolution and the profile reconstruction. The master array may then be entered into a graphics system which permits visual display of the reconstruction of the object, either on a screen such as a CRT, or as a hard copy print. The visual display would preferably include both the real and imaginary profiles which could be viewed by one skilled in the art to determine whether cancerous tissue is located in the investigated body.

For the investigation of a fetus, it is often desirable to obtain a three-dimensional image. The same procedures outlined above for cancer detection would be utilized except that the source and detectors are rotated in two directions. At each different planar view (orientation), the source and detectors are preferably rotated 360° around the object, stopping at different view angles. Of course, as described above, the preprocessing required is slightly different as a projection calculation is required. The visual display would require a more sophisticated system which might use shading and/or might permit substantial user interface to permit two-dimensional slice and three-dimensional representations.

In a technology far removed from the medical arts, the ultrasound diffraction tomography systems and methods disclosed can be used with acoustic rather than ultrasonic sources to construct three-dimensional thermal maps of ocean regions by recognizing that the travel time of acoustic waves is effected by water temperatures.

Of course, there is no intent to be limited by these applications and those skilled in the art will recognize that the ultrasonic embodiments of the invention, and the many variations thereupon, have broad application for both ultrasonics and sonics. In addition, the methods presented above for ultrasound tomography have direct application in X-ray tomography.

In X-ray tomography, the object profile $O(x,y)$ represents the X-ray attenuation profile of a planar section of the object. In the system embodiments of the X-ray tomography invention, the sources are well collimated, quasimonochromatic X-ray sources and the detectors are X-ray detectors. Only the imaginary part of the phase of the detected X-ray field (attenuation) is measured so that phase unwrapping is not necessary. The measured phase is processed by a filtered backpropagation technique identical to that employed in ultrasound tomography. The X-ray tomography systems are applicable to X-ray tomography using both soft and hard radiation. Moreover, in the limiting case where the wavelength becomes zero, the backpropagation filter reduces to unity and the filtered backpropagation technique reduces to the filtered backprojection technique of conventional X-ray tomography.

GEOPHYSICAL TOMOGRAPHY

The geophysical tomography system and method embodiments of the invention are in many ways closely related to the ultrasound tomography embodiments useful in the medical and other arts. The best modes of the geophysical tomography embodiments which may be used to explore aspects of the subsurface terrain between boreholes or between a borehole and the surface utilize sources, detector-transducers, preprocessing systems, backpropagation filters, and master image arrays. The important differences between the geophysical tomography and ultrasound tomography embodiments stem from the physical situations. Clearly, in geophysical tomography, the formation (body) cannot be rotated relative to the sources and detectors. With the detectors and sources on the surface and in a borehole(s), only two-dimensional approximate reconstructions can be accomplished. Another difference between the systems concerns the sources. In geophysical tomography, the sources are sources of sonic or electromagnetic energy and not ultrasonics due to the depth of investigation required, i.e. the distances from borehole to borehole, or borehole to the surface are much greater than the ultrasonics application and hence larger wavelengths are required to obtain large signal to noise ratios at the receivers. Moreover, in geophysical applications, the sources are sources of spherical waves as the formation (body) is larger in relation to the sources. Due to these and other differences which will become apparent, the preprocessing of the detected signals is different from that employed in ultrasonic tomography. Likewise, the filtered backpropagation technique is altered as the standard X-ray filtering function is radically changed due to the different geometries. The backpropagation filter, however, remains essentially the same.

Figure 12B:
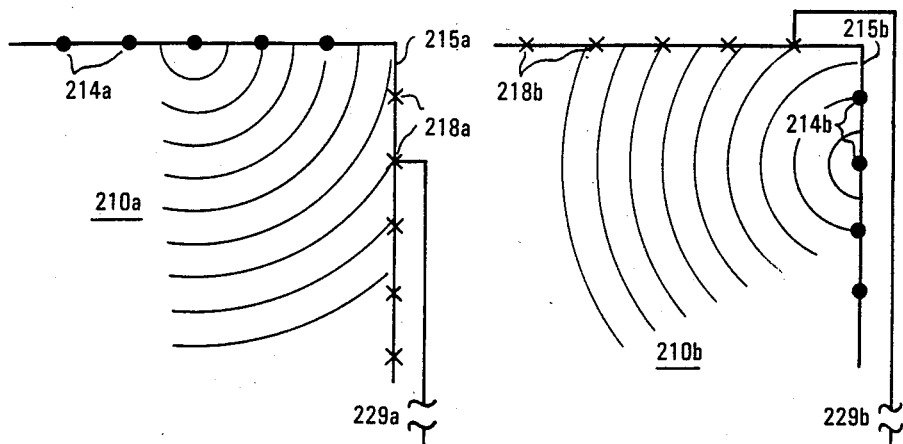
FIG. 12b is an illustration of an alternate preferred geophysical tomographic system embodiment.
Figure 12A:
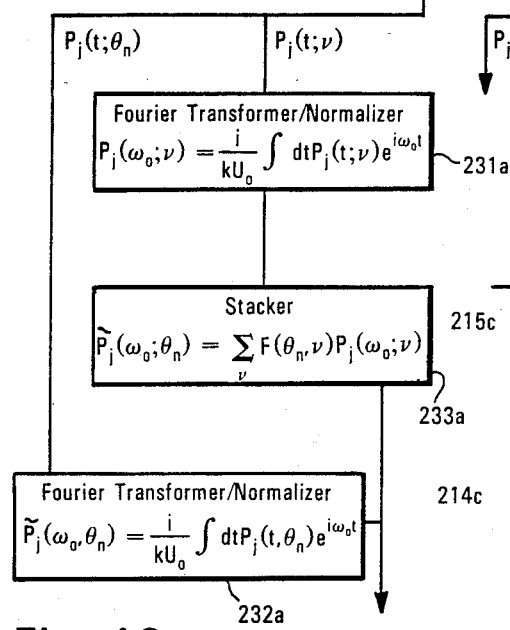
FIG. 12a is a partially schematic, partially block diagram of a geophysical tomographic system depicting a source-detector and signal preprocessing arrangement.
Figure 12C:
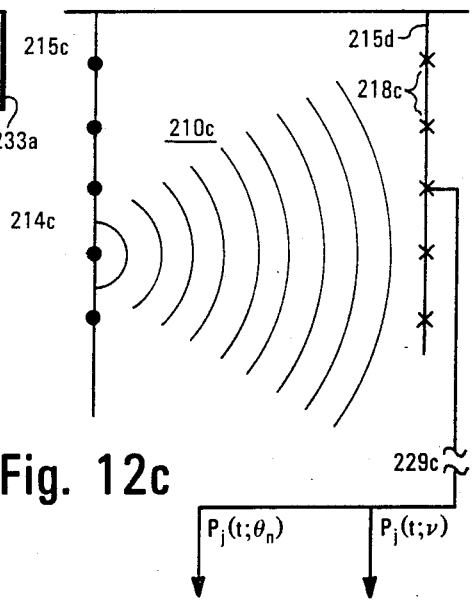
FIG. 12c illustrates the borehole to borehole geophysical tomographic system embodiment.
Figure 13:
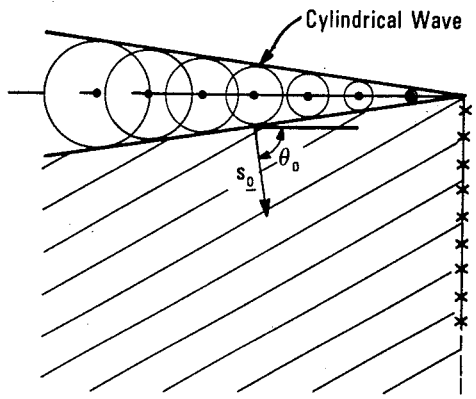
FIG. 13 illustrates the formation of a cylindrical wave of a determined phase from a series of spherical waves.
Figure 14:
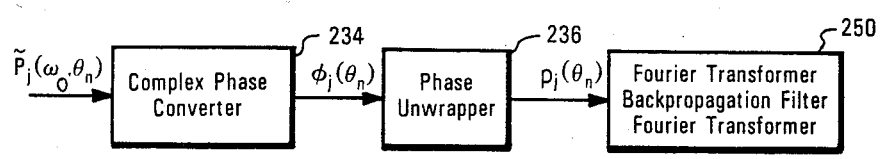
FIG. 14 is a block diagram of the preprocessing and filtering performed on the signals in a geophysical tomographic system embodiment.

More specifically, FIGS. 12a, 12b and 12c show three of the preferred geophysical tomography source detector arrangements of the present invention. FIGS. 12a and 12b show two subsurface electromagnetic or seismic exploration arrangements, while FIG. 12c depicts an electromagnetic or sonic well-to-well tomography arrangement. As seen in FIG. 12a, the transmitter sources 214a may be arranged on the surface of the formation 210a. The sources 214a are typically electromagnetic or sonic energy sources and may be considered to be sources of spherical waves as the sources are in contact with the formation (body) 210a. The sources are preferably pulsed in either of two manners: sequentially; or pulsed together with a variable phase delay between adjacent transmitters 214a. In both cases, the electromagnetic or sonic energy pulse propagates through the formation 210a and is detected by detector elements 218a which are located in borehole 215a. The signals detected at the j'th detector ($j=1, 2, \ldots, N_j$) for the spherical wave transmitted from the $\nu$'th transmitter ($\nu=1, 2, \ldots, N_\nu$) are denoted for the sequentially-pulsed case as $P_j(t;\nu)$; and for the phase delayed case as $P_j(t;\theta_n)$ wherein $\theta_n$ is the phase tilt of the transmitted cylindrical wave as shown in FIG. 13.

Where the sources are pulsed together with a variable phase delay, the detected signals are processed, stored, and A-D converted at break 229a in the same manner as discussed in connection with the ultrasonic embodiments. In the embodiment of the present invention where the sources are pulsed with phase delay; the digitized detected signals $P_j(t; \theta_n)$ are Fourier transformed in time and normalized to yield $\tilde{P}_j(\omega_o, \theta_n)$ according to the equation $$\tilde{P}_j(\omega_o;\theta_n) = \frac{i}{kU_o} \int dt P_j(t;\theta_n) e^{i2\pi f_o t} \tag{24}$$

where $U_o$ is the amplitude of the insonifying cylindrical pulse at its center frequency $f_o$ and $\omega_o = 2\pi f_o$ is the center frequency in radians/second. In this embodiment, the principle value complex phase $\phi_j(\theta_n)$ of $\tilde{P}_j(\omega_o; \theta_n)$ is calculated at 234 of FIG. 14 using the relations $$\text{Real } \phi_j(\theta_n) = \log_e |\tilde{P}_j(\omega_o;\theta_n)| \tag{25a}$$

$$\text{Imag } \phi_j(\theta_n) = \text{ArcTan}\left[\frac{\text{Imag } \tilde{P}_j(\omega_o;\theta_n)}{\text{Real } \tilde{P}_j(\omega_o;\theta_n)}\right]. \tag{25b}$$

The principle valued complex phase array $\phi_j$ is then phase unwrapped to yield the unwrapped complex phase array $p_j(\theta_n)$ as indicated at 236.

In the situation where the pulse duration of the insonifying pulse is very short, the unwrapped complex phase array $p_j(\theta_n)$ is approximately determined by means of the following relations (which are completely analogous to the ultrasonics short pulse situation):

$$\text{Real } p_j(\theta_n) \approx \log_e A_j(\theta_n), \tag{26a}$$

$$\text{Imag } p_j(\theta_n) \approx \omega_o \zeta_j(\theta_n). \tag{26b}$$

In these relationships, $A_j(\theta_n)$ and $\zeta_j(\theta_n)$ are, respectively, the amplitude and phase delay of the pulse received at the j'th detector.

Yet another embodiment applies when the Born approximation is employed. In this case, the array $p_j(\theta_n)$ is calculated using the equations $$p_j(\theta_n) = e^{-\chi} \tilde{P}_j(\omega_o;\theta_n) - \frac{i}{k} \tag{27}$$

where $\chi$ is the phase of the insonifying cylindrical wave along the measurement line. The unwrapped complex phase array $p_j(\theta_n)$ obtained by either of the above three embodiments is then input to a backpropagation system which will be described below.

When the sources are sequentially pulsed, the detected signals are likewise processed, stored and A-D converted. The digital signals are then Fourier transformed in time and normalized at 231a to generate $\tilde{P}_j(\omega_o;\nu)$ and the transformed signal is slant stacked at stacker 233a as is well known in the geophysical arts. The signals $\tilde{P}_j(\omega_o;\nu)$ are preferably stacked so as to simulate the signal that would be received at the j'th detector if a cylindrical wave had been transmitted (i.e., to simulate $\tilde{P}_j(\omega_o;\theta_n)$). Thus, the response of a cylindrical wave is artificially generated by stacking the received signal data. The stacker 233a uses a well-known stacking filter $F(\theta_n,\nu)$ where $\theta_n$ is the phase tilt of the transmitted signal along the transmitter axis as shown in FIG. 13. Stacker 233a thus generates $\tilde{P}_j(\omega_o;\theta_n)$ which is the same signal generated by the phase delayed array.

The calculated unwrapped complex phase array $p_j(\theta_n)$ $j=1, 2, \ldots, N_j$ corresponds to sample values along the borehole axis. The total number of sample values $N_j$ is determined by the number of detecting elements in the receiving array. In order to obtain a good reconstruction of the geological formation lying between the transmitter and receiver axis, it is preferable that a great many sample values of the unwrapped complex phase be determined. This may be accomplished in different ways. If an array of detectors is used, the array must be translated along the measurement line to new locations in order to obtain many sample values unless the array is large enough to span the length of the formation of interest. If the array is moved, the entire set of operations delineated above must be repeated for each location. For the case of a single receiver ($N_j=1$), the unwrapped complex phase is determined only at a single sample point for any given location of the detector. If a total of M sample values are desired, it is then necessary to perform M procedures with the transducer being successively moved from sample point to sample point between procedures.

By means of repeated procedures, the unwrapped complex phase is determined at a total of M sample points along the measurement axis. The M sample values $p_m(\theta_n)$, ($m=1, 2, \ldots, M$) play the same role in geophysical tomography as does the unwrapped phase array $p_m$, $m=1, 2, \ldots M$ obtained in ultrasound tomography. In particular, the array $p_m(\theta_n)$ is input into a backpropagation system 250 to generate a reconstruction of the physical properties of the section of geological formation lying between the transmitter and receiver axes. For the case of sonic energy sources and receivers, the reconstruction yields an acoustic profile analogous to that obtained in ultrasound tomography. For the case of electromagnetic tomography, the reconstruction is of the index of refraction profile of the geological formation.

Figure 15:
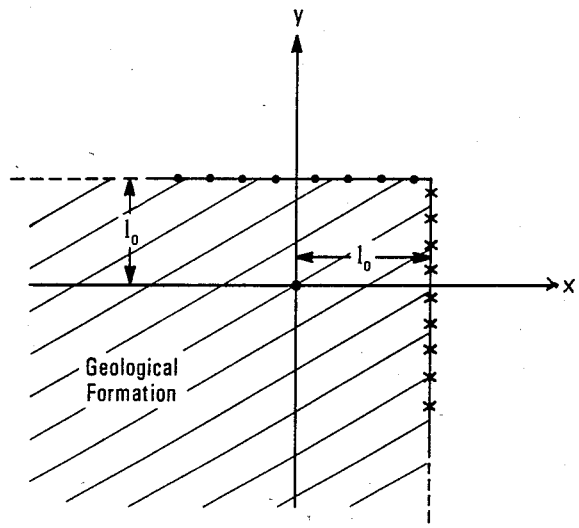
FIG. 15 illustrates the geometry and the associated coordinate system for the geophysical tomography embodiments.

As discussed above, the principle differences between subsurface exploration diffraction tomography and ultrasound diffraction tomography stem from the different geometries involved. The difference in geometries requires a change in the filtered backpropagation technique. In particular, for geophysical applications, the mathematical theory of the prior art discussed in the Background with regard to ultrasonics may be conveniently extended to sonic and elctromagnetic applications. Thus, where it is desirable to reconstruct the profile of a region of geological formation, the Born and Rytov approximations may be employed. Within the approximate models, an equation similar to Equation (10) holds true. In particular, processed signals $D_{\theta 0}(y,\omega_o)$ (hereafter referred to as data) taken along the receiver axis (the line $x=1_o$) as shown in FIG. 15 are related to the object profile of the formation $O(x,y)$ via the equation $$\int_{-\infty}^{\infty} dy D_{\theta_o}(y,\omega) e^{-i\kappa y} = \int\int dx dy O(x,y) e^{-ik(\underline{s}-\underline{s}_0)\cdot\underline{r}}. \quad (28)$$

In this equation, $\underline{s}_0$ is the unit vector normal to a cylindrical wave radiating out from the transmitter axis (see FIG. 13) and $\theta_0$ is the angle that $\underline{s}_0$ makes with the positive x axis. The unit vector $\underline{s}$ is given by $$\underline{s} = \frac{1}{k}(\sqrt{k^2 - \kappa^2}\,\hat{x} + \kappa\hat{y}) \quad (29a)$$

while $\underline{s}_o$ is then $$\underline{s}_0 = \cos\theta_0\hat{x} + \sin\theta_0\hat{y} \quad (29b)$$

where again $\kappa$ is restricted to lie in the interval $-k<\kappa<k$.

From Equation (28) it follows that the one-dimensional Fourier transform of the data $D_{\theta 0}(y,\omega_o)$ yields the two-dimensional Fourier transform $\tilde{O}(K_x,K_y)$ of the object profile over semicircular arcs. However, these semicircular arcs differ from the ones occurring in ultrasound tomography. In particular, the locus of points defined by Equation (11) with $\underline{s}$ and $\underline{s}_0$ given by Equations (29a) and (29b) are semicircles centered at $-k\,\underline{s}_0$ but for which $s_x\equiv\hat{x}\cdot\underline{s}>0$ rather than $\underline{s}\cdot\underline{s}_0>0$ as was the case in ultrasound tomography.

Figure 16:
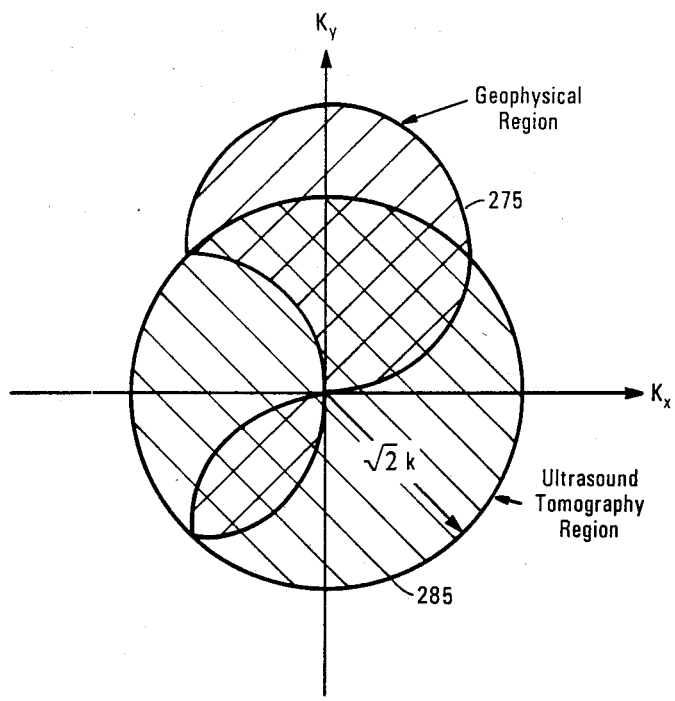
FIG. 16 illustrates the regions in $\underline{K}$ space over which the object's Fourier transform is known for geophysical and ultrasonic tomographic procedures.

It is interesting to note that the angle $\theta_0$ can only range from 0 to $\pi/2$ radians in the geophysical case. Consequently, the data $D_{\theta 0}(y,\omega_o)$ will not allow $\tilde{O}(K_x,K_y)$ to be sampled throughout a region of $\underline{K}$ space as large as was obtained in the ultrasound tomography case. This region is shown as area 275 in FIG. 16, together with the associated region 285 ($|\underline{K}|<\sqrt{2}k$) obtained in the ultrasound tomography case.

In the backpropagation system 250 of the subsurface embodiment, after Fourier transformation, the unwrapped phase array $p_m(\theta_n)$ is filtered using a filtered backpropagation technique $\tilde{H}_{qm}=\tilde{h}_m\tilde{\Gamma}_{qm}$ where $$\tilde{h}_m = \left| k\frac{m}{M}\cos\theta_n - \gamma_m\sin\theta_n \right| \quad (30)$$

and $$\tilde{\Gamma}_{qm} = e^{i\gamma_m(x_q-l_o)}e^{ik(\underline{s}_0\cdot\hat{x}l_o-\underline{s}_0\cdot\underline{r})} \quad (31)$$

where $\gamma_m$ is defined in Equation (23), and x is the unit vector along the x axis.

In this case the convolutional (stationary) deblurring filter $\tilde{h}_m$ is no longer the standard X-ray deblurring filter, but depends explicitly on the tilt angle $\theta_m$ of the insonifying cylindrical wave. Also, the backpropagation filter, $\tilde{\Gamma}_{qm}$, is slightly altered from the ultrasonics case in that it depends on $$\underline{s}_0\cdot\underline{I}=\cos\theta_n x_q+\sin\theta_n y_m \quad (32)$$

where $x_q=q\delta x$ and $y_m=m\delta y$ are the (x, y) coordinates associated with the m, q sample point in the image array. However, for the special case where $\theta_n=0$, corresponding to the measurement line being perpendicular to the unit wavevector $\underline{s}_0$, the filter functions $\tilde{h}_m$ and $\tilde{\gamma}_{qm}$ reduce to those of the ultrasound diffraction tomography.

After the signals have undergone the filtering and backpropagation in a filter bank in backpropagation system 250, the signals are inverse Fourier transformed and interpolated onto a master image array. In the geophysical cases, the arrays need not be rotated as part of the interpolation process as the sources and detectors are not rotated relative to the formation. The master array may be displayed as desired.

By pulsing the sources 214a at a determined tilt and detecting the produced fields with detector 218a along the borehole axis 215a for the entire area of interest, a partial reconstruction profile of the subsurface formation may be created, as discussed above. In order to reconstruct a more complete profile of the subsurface formation, the phase tilt of sources 214a should cover an entire range of 0 to $\pi/2$, wherein the signals for each tilt when separately processsed provided a partial reconstruction of the subsurface formation. As those skilled in the art will recognize, a phase tilt of 0 causes the cylindrical wave formed by the spherical waves to propagate straight down into the formation. A phase tilt of $\pi/2$ causes the wave to propagate toward the borehole in a manner normal to the surface. The range of phase tilt between 0 and $\pi/2$ causes waves entering the formation to propagate at different angles. For each different angle, another partial reconstruction is provided, and the interpolation of those reconstructions onto a master array provides a more complete reconstruction of the subsurface formation.

As seen in FIG. 12b, the location of the sources 214b and the detectors 218b may be reversed from the previously discussed embodiment shown in FIG. 11a. The preprocessing at break 229b and thereafter, and the filtering remain identical. The source 214b, however, is moved in the borehole according to well-known techniques. The detectors 218b may be placed on the surface of the formation or they may be buried slightly under the formation surface as desired. Of course, the phase tilt also covers a range of 0 to $\pi/2$.

FIG. 12c shows the borehole to borehole embodiment of the invention. Sources 214c are located in borehole or well 215c and detectors 218c are located in borehole or well 215d. As discussed with regard to the two other geophysical embodiments, the sources may be pulsed with a phase tilt or in a sequential fashion. The preprocessing at 229c and thereafter and the filtered backpropagation technique are identical to the other geophysical cases. Of prime importance in the borehole to borehole (well to well) embodiment is that the phase tilts of the propagating waves range from 0 to $\pi$, thereby providing a more complete reconstruction of the formation profile. In fact, as those skilled in the art will appreciate, if both sources and detectors are placed in both boreholes 215c and 215d, a full two-dimensional reconstruction of the formation profile may be obtained.

The best mode embodiments of the methods for reconstructing profiles of subsurface formations are integrally connected with the systems and therefore are analogous to the methods for tomographic reconstruction of an object using ultrasound transmission computed tomography. Thus, at least one wave of electromagnetic or sonic energy is directed at a phase tilt into the formation being investigated. The one or more fields produced by the waves are detected as a function of time and signals representative thereof are produced. The produced signals are preprocessed by calibrating, storing, A/D converting, Fourier transforming, normalizing, and, if necessary, stacking. The preprocessed signals are then Fourier transformed and filtered by a filtered backpropagation technique which includes a deblurring filter and a backpropagation filter which depend on phase tilt angle. After another Fourier transformation, the resulting array is a partial reconstruction of the subsurface formation profile. By repeating the steps at different phase tilts and interpolating the resulting arrays onto a master array, a more complete reconstruction may be obtained.

Those skilled in the art will recognize that many permutations and variations may be made in both the methods and systems disclosed for the geophysical (surface and borehole to borehole) embodiments. For example, not only may detectors and sources be placed in one or more boreholes in the borehole to borehole embodiment, but sources and/or detectors may also be placed on the formation surface. It will be appreciated that if sources are placed on the surface and only detectors are placed in the two boreholes, a 0 to $\pi$ range of phase tilts may be covered, and the reconstruction profile of the formation might be quite adequate. In this manner, the problems associated with locating sources in the borehole can be avoided. In any event, the disclosed embodiments are by way of example only and are not intended to limit the invention in any manner.

I claim:

1. A method for the reconstruction of an object which has diffracted at least one wave of energy propagating through it, said wave of energy being selected from a group consisting of sonic and electromagnetic waves, comprising the steps of:
   (a) obtaining signals which are a function of at least one of the phase and amplitude of the diffracted propagating wave after said wave has interacted with said object; and
   (b) converting said signals by means of a filtered backpropagation technique into an array representing a partial reconstruction of the object.

2. A method for the reconstruction of an object according to claim 1 wherein said at least one wave of energy propagating through said object propagates at at least one view angle on a plane further comprising:
   (c) separating said obtained signals into sets of signals, each set of signals representing the signals obtained from the propagation of an energy wave at a separate view angle, wherein by said converting step each set of signals is converted into a separate array representing the partial reconstruction of the object at the separate view angle; and
   (d) interpolating said partial reconstruction arrays onto a master array, wherein the master array represents the two-dimensional reconstruction of the object.

3. A method for the reconstruction of an object according to claim 2 further comprising:
   preprocessing signals after said obtaining step and before said converting step, wherein said signals of said converting step are obtained signals which have been both preprocessed and separated according to said separating and preprocessing steps.

4. A method for the reconstruction of a three-dimensional object which has diffracted waves of energy propagating through it at at least one view angle on a plane and for at least one planar orientation, comprising the steps of:
   (a) obtaining signals which are a function of at least one of the phase and amplitude of each propagating wave after said wave has interacted with said object;
   (b) preprocessing and separating said obtained signals to obtain sets of preprocessed signals, each set representing the signals obtained from the propagation of an energy wave at a separate view angle;
   (c) converting said sets of preprocessed signals by means of a filtered backpropagation technique into arrays representing the partial reconstruction of the object; and
   (d) interpolating each partial reconstruction onto a master array to obtain the two-dimensional reconstruction of a planar projection of the object.

5. A method for the reconstruction of a three-dimensional object according to claim 4 wherein said preprocessing and separating step further comprises:
   (e) additionally separating said obtained signals into second sets of signals, each second set of signals representing the signals obtained from the propagation of an energy wave at a separate planar orientation, wherein by said converting step, the two-dimensional planar projected reconstruction obtained is for each planar orientation, and a three-dimensional reconstruction of the object can be obtained from a plurality of two-dimensional planar projection reconstructions.

6. A method according to claim 2 further comprising: displaying said two-dimensional reconstruction of said object.

7. A method according to claim 4 further comprising: displaying said two-dimensional planar projection reconstruction of said object.

8. A method according to claim 5 further comprising: displaying a reconstruction of a planar section of said object which was reconstructed from said two-dimensional planar projections.

9. A system for the reconstruction of an object which has diffracted at least one wave of energy propagating through it, said wave of energy being selected from a group consisting of sonic and electromagnetic waves, comprising:

(a) means for obtaining signals which are a function of at least one of the phase and amplitude of the diffracted propagating wave after said wave has interacted with said object; and (b) filter means for converting said signals by means of a filtered backpropagation technique into an array representing a partial reconstruction of the object.

10. A system for the reconstruction of an object according to claim 9 wherein said at least one wave of energy propagating through said object propagates at at least one view angle on a plane, further comprising:

(c) means for separating said obtained signals into sets of signals, each set of signals representing the signals obtained from the propagation of an energy wave at a separate view angle, wherein said filter means filters and converts each set of signals into a separate array representing the partial reconstruction of the object at the separate view angle; and (d) interpolation means for interpolating said partial reconstruction arrays onto a master array, wherein the master array represents the two-dimensional reconstruction of the object.

11. A system for the reconstruction of an object according to claim 10 further comprising:

preprocessing means for preprocessing signals which have been obtained by said obtaining means but have not yet been converted by said filter means wherein said signals converted by said filter means are obtained signals which have been both preprocessed and separated by said means for separating and means for preprocessing.

12. A system for the reconstruction of a three-dimensional object which has diffracted waves of energy propagating through it at at least one view angle on a plane for at at least one planar orientation, comprising:

(a) means for obtaining signals which are a function of at least one of the phase and amplitude of each propagating wave after said wave has interacted with said object;

(b) preprocessing and separating means for separating and preprocessing said obtained signals to obtain sets of preprocessed signals, each set representing the signals obtained from the propagation of an energy wave at a separate view angle;

(c) filter means for converting said sets of preprocessed signals into arrays representing the partial reconstruction of the object by means of a filtered backpropagation technique; and (d) interpolation means for interpolating each partial reconstruction array onto a master array to obtain the two-dimensional reconstruction of a planar projection of the object.

13. A system for the reconstruction of a three-dimensional object according to claim 12 wherein said preprocessing and separating means further comprise:

(e) means for separating said sets of preprocessed signals into second sets of signals, each second set of signals representing the signals obtained from the propagation of an energy wave at a separate planar orientation, wherein the two-dimensional planar projected reconstructions obtained are for each planar orientation, and by said filtering a three-dimensional reconstruction of the object can be obtained from a plurality of two-dimensional planar projected reconstructions.

14. A system according to claim 10 further comprising:

display means for displaying said two-dimensional reconstruction of said object.

15. A system according to claim 12 further comprising:

displaying means for displaying said two-dimensional planar projected reconstruction of said object.

16. A system according to claim 13 further comprising:

display means for displaying a reconstruction of a planar section of said object which was reconstructed from said two-dimensional planar projections.

17. A method for the reconstruction of a subsurface geological formation which has diffracted at least one wave of energy propagating through it, said wave of energy being selected from a group consisting of sonic and electromagnetic waves, comprising the steps of:

(a) obtaining signals which are a function of at least one of the phase and amplitude of the diffracted propagating wave after said wave has interacted with said formation; and (b) converting said signals by means of a filtered backpropagation technique into an array representing a partial reconstruction profile of the formation.

18. A method according to claim 17 wherein said at least one wave of energy approximates a cylindrical wave at at least one phase tilt, further comprising:

(c) separating said obtained signals into sets of signals, each set of signals representing the signals obtained from the propagation of an energy wave at a separate phase tilt, wherein by said converting step each set of signals is converted into a separate array representing the partial reconstruction of the formation at the separate phase tilt; and (d) interpolating said partial reconstruction array onto a master array, wherein the master array represents the two-dimensional reconstruction of said formation.

19. A method according to claim 18 further comprising:

preprocessing signals after said obtaining step and before said converting step, wherein said signals of said converting step are obtained signals which have been both preprocessed and separated according to said separating and preprocessing steps.

20. A method according to claim 18 further comprising:

displaying said two-dimensional reconstruction of said subsurface formation.

21. A system for the reconstruction of a subsurface geological formation which has diffracted at least one wave of energy propagating through it, said wave of energy being selected from a group consisting of sonic or electromagnetic waves, comprising:

(a) means for obtaining signals which are a function of at least one of the phase and amplitude of the diffracted propagating wave after said wave has interacted with said formation; and (b) filter means for converting said signals by means of a filtered backpropagation technique into an array representing a partial reconstruction of the formation.

22. A system according to claim 21 wherein said at least one wave of energy approximates at least one cylindrical wave at at least one phase tilt, further comprising:

(c) means for separating said obtained signals into sets of signals, each set of signals representing the signals obtained from the propagation of an energy wave at a separate phase tilt, wherein said filter means filter and converts each set of signals into a separate array representing the partial reconstruction of the formation at the separate phase tilt; and (d) interpolation means for interpolating said partial reconstruction array onto a master array, wherein the master array represents the two-dimensional reconstruction of said formation.

23. A system according to claim 22 further comprising:
preprocessing means for preprocessing signals which have been obtained by said obtaining means but have not yet been converted by said filter means wherein said signals converted by said filter means are obtained signals which have been both preprocessed and separated by said means for separating and means for preprocessing.

24. A system according to claim 22 further comprising:
display means for displaying said two-dimensional reconstruction of said formation.

25. A method for tomographic reconstruction of a two-dimensional object comprising:
(a) directing at a view angle one or more waves of energy toward an object being examined;
(b) detecting as a function of time the one or more fields produced by said one or more waves;
(c) producing one or more signals which are functions of said one or more detected fields; and
(d) filtering said produced signals according to a filtered backpropagation technique to generate a two-dimensional array representing the partial reconstruction of the object.

26. A method for tomographic reconstruction of a two-dimensional object according to claim 25 further comprising:
(e) interpolating said partial reconstruction onto a master array;
(f) changing said view angle; and
(g) repeating steps a–f at different view angles to obtain a two-dimensional reconstruction of the object.

27. A method according to claim 26 further comprising:
(h) displaying said two-dimensional reconstruction of the object.

28. A method for tomographic reconstruction of a two-dimensional object according to claim 26 further comprising:
preprocessing said produced signals before said filtering step, wherein said produced signals filtered by said backpropagation filter are preprocessed signals.

29. A method according to claim 28 wherein said preprocessing step comprises:
converting said one or more produced signals from analog to digital form;
transforming said digital signals over time with a Fourier transform;
normalizing said transformed signals;
complex phase converting said normalized signals; and
phase unwrapping said complex phase converted signals to produce a one-dimensional array for input into said filtering step.

30. A method according to claim 26 wherein said filtering step comprises:
filtering said preprocessed signals with a standard X-ray tomographic filter; and
backpropagating the filtered preprocessed signals according to a backpropagation filter.

31. A method according to claim 30 wherein:
said preprocessed signals are filtered and backpropagated according to the filtered backpropagation technique $$\vec{H}_{q,m} = \vec{h}_m e^{i(\gamma_m - k)(z_q - l_o)}$$

wherein $\vec{H}_{q,m}$ is a filtered backpropagation technique for object depth $z_q$, and m indexes sample values of said preprocessed signals;
$\vec{h}_m$ is a standard X-ray tomography filter;
$\gamma_m = k\sqrt{1 - (m/M)^2}$, where M is the number of detectors detecting said fields;
k is the wavenumber associated with the frequency of said directed waves;
$z_q$ is the distance of the investigated object depth q from the axis of rotation of said object; and
$l_o$ is the distance between the axis of rotation of said object and the detector array.

32. A method according to claim 28 wherein said detected wave of energy is a very short pulse and said preprocessing step comprises:
converting said produced signal from analog to digital form;
timing the delay between the directing and detecting of said pulse;
measuring the peak amplitude of said detected fields; and
providing said timed delay and measured peak amplitude for unwrapped complex phase converting said converted signals to produce a one-dimensional array for input into said filtering step.

33. A method for tomographic reconstruction of a three-dimensional object comprising:
(a) directing at a view angle on a plane one or more waves of energy toward an object being examined;
(b) detecting as a function of time the one or more fields produced by said one or more waves;
(c) producing one or more signals which are functions of said one or more detected fields;
(d) preprocessing said produced signals; and
(e) filtering said preprocessed signals according to a filtered backpropagation technique to generate a two-dimensional array representing the partial reconstruction of the object.

34. A method for tomographic reconstruction of a three-dimensional object according to claim 33 further comprising:
(f) interpolating said partial reconstruction array onto a master array;
(g) changing said view angle on said plane; and
(h) repeating steps a–g at different view angles on said plane to obtain a two-dimensional reconstruction of a planar projection of the object.

35. A method for tomographic reconstruction of a three-dimensional object according to claim 34 further comprising:
(i) changing said plane on which said waves of energy are directed at a view angle; and
(j) repeating steps a–i at a sufficient number of different planes to obtain a plurality of planar projections of the three-dimensional object profile from which a full three-dimensional reconstruction of the object profile can be obtained.

36. A method according to claim 34 further comprising:
displaying said planar projection of the three-dimensional reconstruction of the object.

37. A method according to claim 35 further comprising:
displaying a reconstruction of a planar section of said object profile which is obtained from said planar projections.

38. A method according to claim 35 wherein said preprocessing step comprises: projecting a two-dimensional array of said produced signals onto the line formed by the intersection of the detecting plane with the plane of rotation of the directing-detecting system to produce a one-dimensional array for input into said filtering step.

39. A method according to claim 38 wherein said preprocessing step further comprises:
converting said produced signal from analog to digital form;
transforming said digital signals over time with a Fourier transform;
normalizing said transformed signals;
complex phase converting said normalized signals; and
phase unwrapping said complex phase converted signals to produce a one-dimensional array for input into said filtering step.

40. A method according to claim 35 wherein said filtering step comprises:
filtering said preprocessed signals with a standard X-ray tomographic filter; and
backpropagating the filtered preprocessed signals according to a backpropagation filter.

41. A method according to claim 40 wherein:
said preprocessed signals are filtered and backkpropagated according to a filtered backpropagation technique $$\overline{H}_{q,m} = \overline{h}_m e^{i(\gamma_m - k)(z_q - l_o)}$$

wherein $\overline{H}_{q,m}$ is a filtered backpropagation technique for object depth $z_q$, and m indexes samples values of said preprocessed signals;
$\overline{h}_m$ is a standard X-ray tomography filter;
$\gamma_m = k\sqrt{1 - (m/M)^2}$, where M is the number of detectors detecting said fields;
k is the wavenumber associated with the frequency of said directed waves;
$z_q$ is the distance of the investigated object depth q from the axis of rotation of said object; and
$l_o$ is the distance between the axis of rotation of said object and the detector array.

42. A method according to claim 35 wherein said directed wave of energy is a very short pulse and said preprocessing step comprise:
converting said produced signal from analog to digital form;
timing the delay between the directing and detecting of said pulse;
measuring the peak amplitude of said detected fields; and
unwrapped complex phase converting said delay time and peak amplitude measured signals to produce a one-dimensional array for input into said filtering step.

43. A system for tomographic reconstruction of a two-dimensional object comprising:
(a) one or more sources of waves of energy directed at a view angle at an object;
(b) one or more detecting means for detecting as a function of time the one or more fields produced by the waves interacting with said object;
(c) signal producing means for producing signals which are functions of said fields; and
(d) filter means for filtering said produced signals according to a backpropagation technique to generate a two-dimensional array representing the partial reconstruction of the object.

44. A system for tomographic reconstruction of a two-dimensional object according to claim 43 further comprising:
(e) interpolation means for interpolating said partial reconstruction array onto a master array; and
(f) view angle changing means for changing said view angle.

45. A system according to claim 44 further comprising:
(g) display means for displaying said master array so that a two-dimensional reconstruction of the object may be viewed.

46. A system for tomographic reconstruction of a two-dimensional object according to claim 44 further comprising:
preprocessing means for preprocessing said signals produced by said signal producing means.

47. A system according to claim 46 wherein said preprocessing means comprises:
an analog to digital converter for converting said detected signals;
a Fourier transformer for transforming said converted signals;
a normalizer for normalizing said transformed signals;
complex phase converting means for complex phase converting said normalized signals; and
phase unwrapping means for phase unwrapping said complex phase converted signals.

48. A system according to claim 46 wherein said detected wave of energy comprises a very short pulse and said preprocessing means comprises:
an analog to digital converter;
delay timing means for timing the delay time between the directing and detecting of said pulse;
amplitude measuring means for measuring the peak amplitude of said detected fields; and
means for receiving the outputs of said delay timing means and amplitude measuring means and for converting said timed and measured signals into a two-dimensional array for input into said filter means.

49. A system according to claim 44 wherein said filter comprises:
standard X-ray tomographic filtering means for implementing the standard X-ray tomographic filter; and
backpropagation filter means for backpropagating the filtered preprocessed signals.

50. The system of claim 49 wherein:
said preprocessed signals are filtered and backpropagated according to the backpropagation technique $$\overline{H}_{q,m} = \overline{h}_m e^{i(\gamma_m - k)(z_q - l_o)}$$

wherein $\overline{H}_{q,m}$ is a filtered backpropagation technique for object depth $z_q$, and m indexes sample values of said preprocessed signals;

$\overline{h}_m$ is a standard X-ray tomography filter;

$\gamma_m = k\sqrt{1-(m/M)^2}$, where M is the number of detectors detecting said fields;

k is the wavenumber associated with the frequency of said directed waves;

$z_q$ is the distance of the investigated object depth q from the axis of rotation of said object; and $l_o$ is the distance between the axis of rotation of said object and the detector array.

51. A system for tomographic reconstruction of a three-dimensional object comprising:
   (a) one or more sources of waves of energy directed at a view angle on a plane at an object;
   (b) one or more detecting means for detecting as a function of time the one or more fields produced by the waves interacting with said object;
   (c) signal producing means for producing signals which are functions of said one or more fields;
   (d) preprocessing means for preprocessing said produced signals; and
   (e) filter means for filtering said preprocessed signals according to a filtered backpropagation technique to generate a two-dimensional array representing the partial reconstruction of the object.

52. A system for tomographic reconstruction of a three-dimensional object according to claim 51 further comprising:
   (f) interpolation means for interpolating said partial reconstruction array onto a master array; and
   (g) view angle changing means for changing said view angle, wherein a two-dimensional planar projection reconstruction may be obtained.

53. A system for tomographic reconstruction of a three-dimensional object according to claim 52 further comprising:
   (h) plane changing means for changing said plane on which said energy waves are directed at said view angles, wherein a three-dimensional reconstruction may be obtained.

54. A system according to claim 53 further comprising:
   display means for displaying said master array so that two-dimensional planar projection reconstruction or a three-dimensional reconstruction may be viewed.

55. A system according to claim 53 further comprising:
   display means for displaying a reconstruction of a planar section of said object which is obtained from said planar projection reconstructions.

56. A system according to claim 53 wherein said preprocessing means comprises:
   projection calculating means for projecting the two-dimensional array produced by said signal producing means onto a line formed by the intersection of the plane of said detecting means and the plane of rotation of said object of said source and detecting means.

57. A system according to claim 53 wherein said preprocessing means further comprises:
   an analog to digital converter for converting said detected signals;
   a Fourier transformer for transforming said converted signals;
   a normalizer for normalizing said transformed signals;
   complex phase converting means for complex phase converting said normalized signals; and
   phase unwrapping means for phase unwrapping said complex phase converted signals.

58. A system according to claim 53 wherein said filter comprises:
   standard X-ray tomographic filtering means for implementing the standard X-ray tomographic filter; and
   backpropagation filter means for backpropagating the filtered preprocessed signals.

59. A method according to claim 58 wherein:
   said preprocessed signals are filtered and backpropagated according to the filtered backpropagation technique $$\overline{H}_{q,m} = \overline{h}_m e^{i(\gamma_m - k)(z_q - l_o)}$$

wherein $\overline{H}_{q,m}$ is a filtered backpropagation technique for object depth $z_q$, and m indexes sample values of said preprocessed signals;

$\overline{h}_m$ is a standard X-ray tomography filter;

$\gamma_m = k\sqrt{1-(m/M)^2}$, where M is the number of detectors detecting said fields;

k is the wavenumber associated with the frequency of said directed waves;

$z_q$ is the distance of the investigated object depth q from the axis of rotation of said object; and $l_o$ is the distance between the axis of rotation of said object and the detector array.

60. A system according to claim 53 wherein said directed wave of energy comprises a very short pulse and said preprocessing means comprises:
   an analog to digital converter;
   delay timing means for timing the delay between the directing and detecting of said pulse;
   amplitude measuring means for measuring the peak amplitude of said detected fields; and
   means for receiving the outputs of said delay timing means and amplitude measuring means and for converting said timed and measured signals into a two-dimensional array for input into said filter means.

61. A method for tomographic reconstruction of a subsurface formation comprising:
   (a) directing one or more waves of energy into said formation, the totality of said waves approximating one or more cylindrical waves of a given phase tilt;
   (b) detecting as a function of time the one or more fields produced by said one or more waves;
   (c) producing one or more signals which are functions of said one or more detected fields; and
   (d) filtering said produced signals according to a filtered backpropagation technique to generate a two-dimensional array representing the partial reconstruction of the subsurface formation.

62. A method for tomographic reconstruction of a subsurface formation according to claim 61 further comprising:
   (e) interpolating said partial reconstruction onto a master array;
   (f) changing the phase tilt of said directed waves; and
   (g) repeating steps a–f at different phase tilts to obtain a partial two-dimensional reconstruction of the subsurface formation.

63. A method according to claim 62 further comprising:

displaying said partial reconstruction of said subsurface formation.

64. A method according to claim 62 wherein:
said one or more directed waves are directed from the surface of said formation towards at least one borehole in said formation, said detecting occurring in said at least one borehole.

65. A method according to claim 62 wherein:
said one or more directed waves are directed from at least one borehole in said formation towards the surface of said earth formation, said detecting occurring on said surface.

66. A method according to claim 62 wherein:
said one or more directed waves are directed from at least one borehole in said formation toward at least one other borehole in said formation, said detecting occurring in said at least one other borehole.

67. A method according to claim 62 wherein:
said directed waves are directed from at least one borehole in said formation toward at least one other borehole in said formation and toward the surface of said formation, said detecting occurring in said at least one other borehole in said formation and on or above said surface.

68. A method according to claim 62 further comprising:
preprocessing said produced signals wherein said produced signals of said filtering step are preprocessed signals.

69. A method according to claim 62 wherein:
said directed waves are produced by spherical wave point source emitters which approximate a cylindrical wave by pulsing with a variable phase delay between each emitter.

70. A method according to claim 68 wherein:
said directed waves are produced by spherical wave point source emitters which in conjunction with said preprocessing approximate a cylindrical wave by sequentially pulsing, wherein said preprocessing comprises stacking the detected signals.

71. A method according to claim 68 wherein said preprocessing step comprises:
converting said produced signals from analog to digital form;
transforming said analog signals over time with a Fourier transform;
normalizing said transformed signals;
complex phase converting said normalized signals; and
phase unwrapping said complex phase converted signals to produce a one-dimensional array for input into said filtering step.

72. A method according to claim 68 wherein said directed wave of energy comprises a very short pulse and said preprocessing step comprises:
an analog to digital converter;
delay timing means for timing the delay time between the directing and detecting of said one or more energy waves;
amplitude measuring means for measuring the peak amplitude of said one or more detected fields; and
providing said timed delay and measured peak amplitude for unwrapped complex phase converting said timed and measured signals to produce a two-dimensional array for input into said filter means.

73. A method according to claim 68 wherein said preprocessing step comprises:

converting said produced signals from analog to digital form;
transforming said analog signals over time with a Fourier transformer;
normalizing said to transform signals; and
processing said normalized signals according to the Born approximation.

74. A method according to claim 62 wherein said filtering step comprises:
filtering said preprocessed signals with a convolutional phase-tilt dependent deblurring filter; and
backpropagating the filtered preprocessed signals according to a backpropagation filter.

75. A method according to claim 74 wherein:
said preprocessed signals are filtered and backpropagated according to a filtered backpropagation technique $$\overline{H}_{q,m} = \overline{h}_m e^{i\gamma_m(x_q - l_o)} e^{ik(s_0 \cdot \hat{x} l_o - s_0 \cdot r)}$$

wherein $\overline{H}_{q,m}$ is a filtered backpropagation technique for object depth $x_q$, and m indexes sample values of preprocessed signals;
$\overline{h}_m$ is a convolutional, phase-tilt dependent, deblurring filter;
$\gamma_m = k\sqrt{1 - (m/M)^2}$, where M is the number of detectors detecting said fields;
k is the wavenumber associated with the frequency of said directed waves;
$x_q$ is the distance of the investigated object depth q from the axis of rotation of said object;
$\hat{x}$ is the x axis unit vector;
$l_o$ is the distance between the axis of rotation of said object and the detector array; and
$s_0 \cdot r$ is a scalar product between the unit propagation vector $s_0$ and the position vector $r$.

76. A system for tomographic reconstruction of a subsurface earth formation comprising:
(a) one or more sources of waves of energy directed at said earth formation, wherein the totality of the waves of said one or more sources approximate one or more cylindrical waves of a given phase tilt;
(b) one or more detecting means for detecting as a function of time the one or more fields produced by the waves interacting with said earth formation;
(c) signal producing means for producing signals which are a function of said one or more fields; and
(d) filter means for filtering said produced signals according to a filtered backpropagation technique to generate a two-dimensional array representing the partial reconstruction of the subsurface formation.

77. A system for tomographic reconstruction of a subsurface earth formation according to claim 76 further comprising:
(e) interpolation means for interpolating said partial reconstruction array onto a master array; and
(f) phase tilt changing means for changing the phase tilt of said one or more waves of energy directed into said earth format.

78. A system for tomographic reconstruction of a subsurface earth formation comprising claim 77 further comprising:
(g) display means for displaying said two-dimensional reconstruction of the earth formation.

79. A system according to claim 77 wherein:
said one or more sources of waves are located on the surface of said earth formation; and said one or more detecting means are located in at least one borehole in said earth formation.

80. A system according to claim 77 wherein:
said one or more sources of waves are located in at least one borehole of said earth formation; and
said one or more detecting means are located on the surface of said formation.

81. A system according to claim 77 wherein:
said one or more source of waves are located in at least one borehole in said earth formation formation; and
said one or more detecting means are located in at least one other borehole in said earth formation.

82. A system according to claim 77 further comprising:
preprocessing means for preprocessing said produced signals, wherein said produced signals of said filter means are preprocessed signals.

83. A system according to claim 77 wherein:
said one or more sources of waves are a plurality of spherical wave point source emitters which approximate a cylindrical wave by emitting with a variable phase delay between each source.

84. A system according to claim 82 wherein:
said one or more sources of waves comprise a plurality of spherical wave point source emitters which in conjunction with said preprocessing means approximate a cylindrical wave by sequentially pulsing, wherein said preprocessing means comprises a stacker for stacking said detected signal.

85. A system according to claim 82 wherein said preprocessing means comprises:
converting means for converting said produced signals from analog to digital form;
Fourier transforming means for transforming said analog signals over time with a Fourier transformer;
normalizing means for normalizing said Fourier transformed signals;
complex phase converting means for complex phase converting said normalized signals; and
phase unwrapping means for phase unwrapping said complex phase converted signals to produce a one-dimensional array for input into said filtering step.

86. A system according to claim 82 wherein said directed wave of energy comprises a very short pulse and said preprocessing means comprises:
an analog to digital converter;
delay timing means for timing the delay between the directing and detecting of said pulse;
amplitude measuring means for measuring the peak amplitude of said detected fields; and
means for receiving the outputs of said delay timing means and amplitude measuring means and for converting said timed and measured signals into a two-dimensional array for input into said filter means.

87. A system according to claim 82 wherein said preprocessing means comprises:
an analog to digital converter for converting said produced signals for analog to digital form;
a Fourier transformer for transforming said signals over time;
a normalizer for normalizing said transformed signals, and
a processor for processing said normalized signals according to the Born approximation.

88. The system of claim 76 wherein said filtering means comprises:
convolutional, phase-tilt dependent, deblurring filtering means; and
backpropagation filter means for backpropagating the filtered preprocessed signals.

89. A method according to claim 88 wherein:
said preprocessed signals are filtered and backpropagated according to a filtered backpropagation technique $$\overline{H}_{q,m} = \overline{h}_m e^{i\gamma_m(x_q - l_o)} e^{ik(\underline{s}_0 \cdot \hat{x} l_o - \underline{s}_0 \cdot \underline{r})}$$

wherein $\overline{H}_{q,m}$ is a filtered backpropagation technique for object depth $x_q$, and m indexes sample values of preprocessed signals;
$\overline{h}_m$ is a convolutional, phase-tilt dependent, deblurring filter;
$\gamma_m = k\sqrt{1 - (m/M)^2}$, where M is the number of detectors detecting said fields;
k is the wavenumber associated with the frequency of said directed waves;
$x_q$ is the distance of the investigated object depth q from the axis of rotation of said object;
$\hat{x}$ is the x axis unit vector;
$\overline{l}_o$ is the distance between the axis of rotation of said object and the detector array; and
$\underline{s}_0 \cdot \underline{r}$ is a scalar product between the unit propagation vector $\underline{s}_o$ and the position vector r.

90. A method for the reconstruction of an object which has diffracted at least one wave of energy propagating through it, said wave of energy being selected from a group consisting of sonic or electromagnetic waves, comprising the steps of:
(a) obtaining signals which are a function of at least one of the phase and amplitude of the diffracted propagating wave after said wave has interacted with said object;
(b) converting said signals by means of a backpropagation filter into an array representing a partial reconstruction of the object; and
(c) generating a tangible record of said array representing said partial reconstruction of the object.

91. A system for the reconstruction of an object which has diffracted at least one wave of energy propagating through it, said wave of energy being selected from a group consisting of sonic or electromagnetic waves, comprising:
(a) means for obtaining signals which are a function of at least one of the phase and amplitude of the diffracted propagating wave after said wave has interacted with said object;
(b) filter means for converting said signals by means of a backpropagation filter into an array representing a partial reconstruction of the object; and
(c) means for generating a tangible record of said array representing said partial reconstruction of said object.

* * * * *